US010964248B2

(12) United States Patent
Tichelaar et al.

(10) Patent No.: US 10,964,248 B2
(45) Date of Patent: Mar. 30, 2021

(54) OPTIMIZED DECODED HIGH DYNAMIC RANGE IMAGE SATURATION

(71) Applicant: KONINKLIJKE PHILIPS N.V., Eindhoven (NL)

(72) Inventors: Johannes Yzebrand Tichelaar, Eindhoven (NL); Mark Jozef Willem Mertens, Eindhoven (NL); Johannes Gerardus Rijk Van Mourik, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/609,045

(22) PCT Filed: May 3, 2018

(86) PCT No.: PCT/EP2018/061280
§ 371 (c)(1),
(2) Date: Oct. 28, 2019

(87) PCT Pub. No.: WO2018/202744
PCT Pub. Date: Nov. 8, 2018

(65) Prior Publication Data
US 2020/0193890 A1 Jun. 18, 2020

(30) Foreign Application Priority Data
May 5, 2017 (EP) .................................. 17169671

(51) Int. Cl.
*H04N 19/98* (2014.01)
*H04N 19/46* (2014.01)
*G09G 3/20* (2006.01)

(52) U.S. Cl.
CPC ... *G09G 3/2003* (2013.01); *G09G 2320/0276* (2013.01)

(58) Field of Classification Search
None
See application file for complete search history.

(56) References Cited

U.S. PATENT DOCUMENTS

| 5,768,427 A * | 6/1998 | Pan | ...................... H04N 11/042 375/240.03 |
| 5,793,892 A * | 8/1998 | Pan | ...................... H04N 19/503 348/390.1 |

(Continued)

FOREIGN PATENT DOCUMENTS

| WO | 2005104035 A1 | 11/2005 |
| WO | 2007082562 A2 | 6/2007 |

(Continued)

OTHER PUBLICATIONS

International Search Report and Written Opinion from PCT/EP2018/061280 dated Jul. 23, 2018.

*Primary Examiner* — Martin Mushambo

(57) ABSTRACT

To enable better color and in particular color saturation control for HDR image handling systems which need to do luminance dynamic range conversion, e.g. from a SDR image to an image optimized for rendering on a display of higher display peak brightness and dynamic range, the inventors invented an apparatus (400) for processing a color saturation (C'bL, C'rL) of an input color (Y'L, C'bL, C'rL) of an input image (Im RLDR) to yield an output color (Y'M, Cb'M, Cr'M) of an output image (Im3000nit) corresponding to the input image, which output image is a re-grading of the input image characterized by the fact that its pixel colors have a different normalized luminance position (Y2) compared to the normalized luminance positions of the input colors (Y1), the normalized luminances being defined as the luminance of a pixel divided by the respective maximal codeable luminance of the image's luminance representation, whereby the ratio of the maximum codeable luminance (Continued)

of the input image and the maximum codeable luminance of the output image is at least 4 or larger, or $\frac{1}{4}^{th}$ or smaller, the apparatus comprising a luminance processor (401) arranged to apply a display tuned luminance mapping function (F_L_da) to determine an output luminance (Y'M) from the input luminance (Y'L) of the input color, the apparatus further comprising a saturation factor determination unit (402) arranged to calculate a final saturation processing strategy (b; Bcorr) based on an initial saturation processing strategy (F_sat) and based on a secondary luminance value (Y'_H) which is derivable from the output luminance (Y'M) by applying a luminance mapping function (F M2H) which is based on the luminance mapping function (F_L_s2h).

8 Claims, 17 Drawing Sheets

(56) References Cited

U.S. PATENT DOCUMENTS

| | | | | |
|---|---|---|---|---|
| 6,459,436 B1* | 10/2002 | Kumada | ........... | G09G 5/02 345/589 |
| 6,972,793 B1* | 12/2005 | Kameyama | ........... | H04N 9/68 348/222.1 |
| 7,573,610 B2* | 8/2009 | Um | ........... | H04N 1/6058 345/603 |
| 2004/0036704 A1* | 2/2004 | Han | ........... | H04N 9/68 345/690 |
| 2005/0030305 A1* | 2/2005 | Brown | ........... | G02B 26/101 345/207 |
| 2007/0002035 A1* | 1/2007 | Plut | ........... | G06F 1/3265 345/211 |
| 2008/0055290 A1* | 3/2008 | Someya | ........... | G09G 3/3413 345/204 |
| 2008/0212892 A1* | 9/2008 | Doida | ........... | G06T 5/009 382/274 |
| 2008/0297531 A1* | 12/2008 | Ueyama | ........... | G09G 3/2003 345/590 |
| 2009/0208099 A1* | 8/2009 | Yoshii | ........... | G06T 5/40 382/167 |
| 2010/0177203 A1* | 7/2010 | Lin | ........... | H04N 9/045 348/222.1 |
| 2011/0148908 A1* | 6/2011 | Jeong | ........... | G09G 5/02 345/590 |
| 2011/0228168 A1* | 9/2011 | Chiang | ........... | H04N 9/643 348/645 |
| 2011/0279749 A1* | 11/2011 | Erinjippurath | ........ | H04N 13/351 349/61 |
| 2012/0127194 A1* | 5/2012 | Richards | ........... | G09G 5/026 345/590 |
| 2012/0256969 A1* | 10/2012 | Scheibe | ........... | G09G 5/02 345/690 |
| 2012/0306905 A1* | 12/2012 | Kim | ........... | G09G 3/3611 345/589 |
| 2013/0106923 A1* | 5/2013 | Shields | ........... | G09G 3/3406 345/690 |
| 2013/0194321 A1* | 8/2013 | Wan | ........... | G06T 11/40 345/690 |
| 2013/0335682 A1* | 12/2013 | Gilbert | ........... | G09G 3/3607 349/85 |
| 2014/0037205 A1* | 2/2014 | Su | ........... | H04N 19/105 382/166 |
| 2014/0078165 A1* | 3/2014 | Messmer | ........... | H04N 1/603 345/589 |
| 2015/0235612 A1* | 8/2015 | Okumura | ........... | H04N 9/67 345/589 |
| 2015/0235615 A1* | 8/2015 | Yoshida | ........... | G09G 5/028 345/600 |
| 2015/0277840 A1* | 10/2015 | Ninan | ........... | G09G 5/026 345/589 |
| 2015/0358646 A1* | 12/2015 | Mertens | ........... | H04N 9/68 382/166 |
| 2016/0225342 A1* | 8/2016 | Smolic | ........... | G09G 5/06 |
| 2016/0248939 A1* | 8/2016 | Thurston | ........... | H04N 1/603 |
| 2016/0307602 A1* | 10/2016 | Mertens | ........... | G11B 27/031 |
| 2016/0352995 A1* | 12/2016 | Min | ........... | G06T 5/50 |
| 2017/0061591 A1* | 3/2017 | Park | ........... | G06T 5/007 |
| 2017/0180759 A1* | 6/2017 | Mertens | ........... | H04N 19/16 |
| 2018/0110493 A1* | 4/2018 | Golan | ........... | A61B 6/5241 |
| 2018/0330160 A1* | 11/2018 | Yamamoto | ......... | G06K 9/00255 |

FOREIGN PATENT DOCUMENTS

| | | | |
|---|---|---|---|
| WO | WO-2013046095 A1 * | 4/2013 | ........... G09G 3/2003 |
| WO | 2014128586 A1 | 8/2014 | |
| WO | 2015124754 A1 | 8/2015 | |

\* cited by examiner

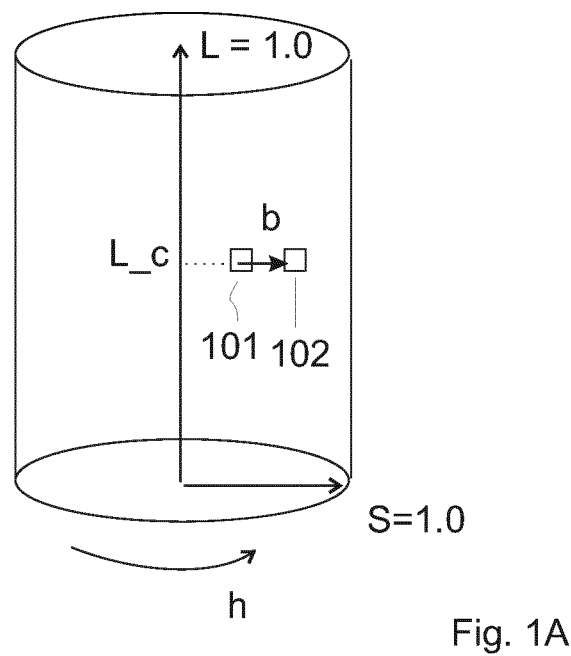
Fig. 1A
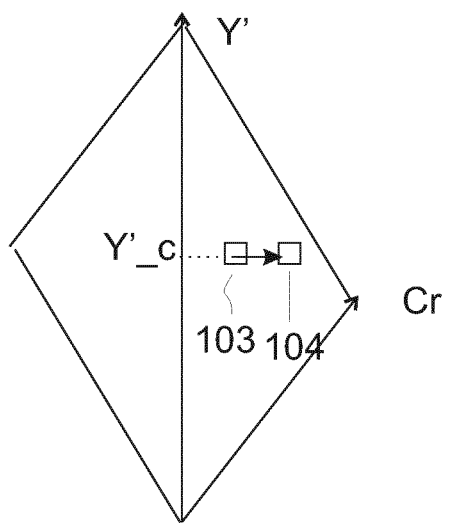
Fig. 1B
Fig. 1

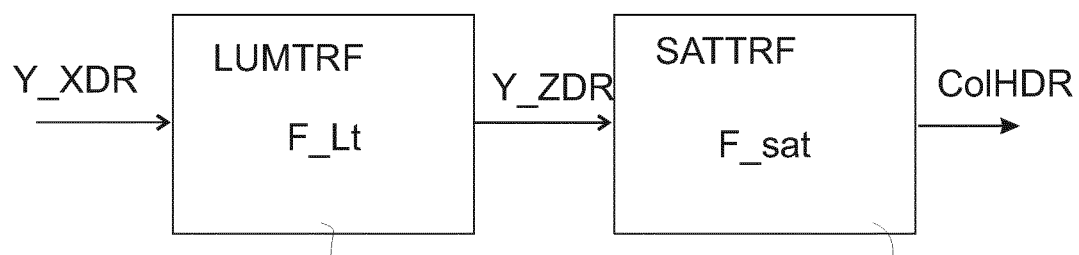
Fig. 5A
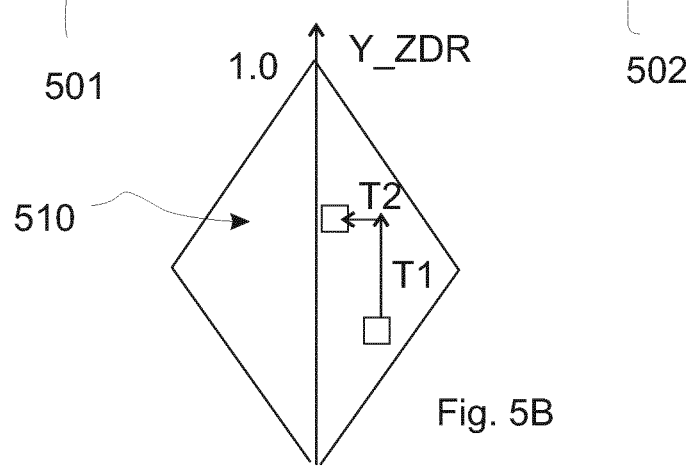
Fig. 5B
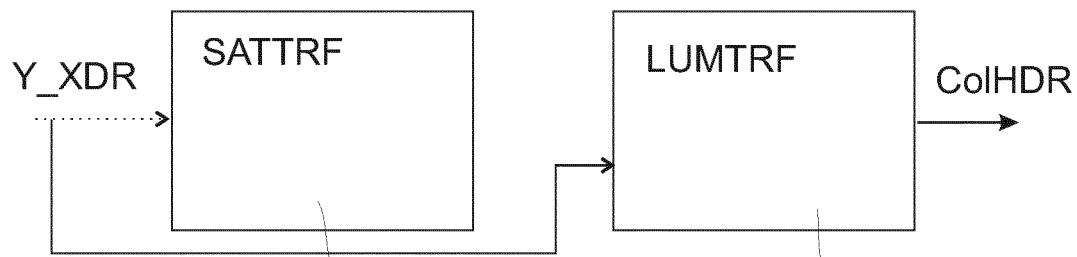
Fig. 5C
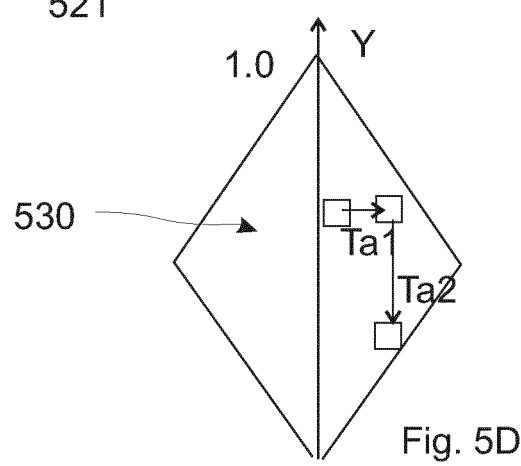
Fig. 5D
Fig. 5

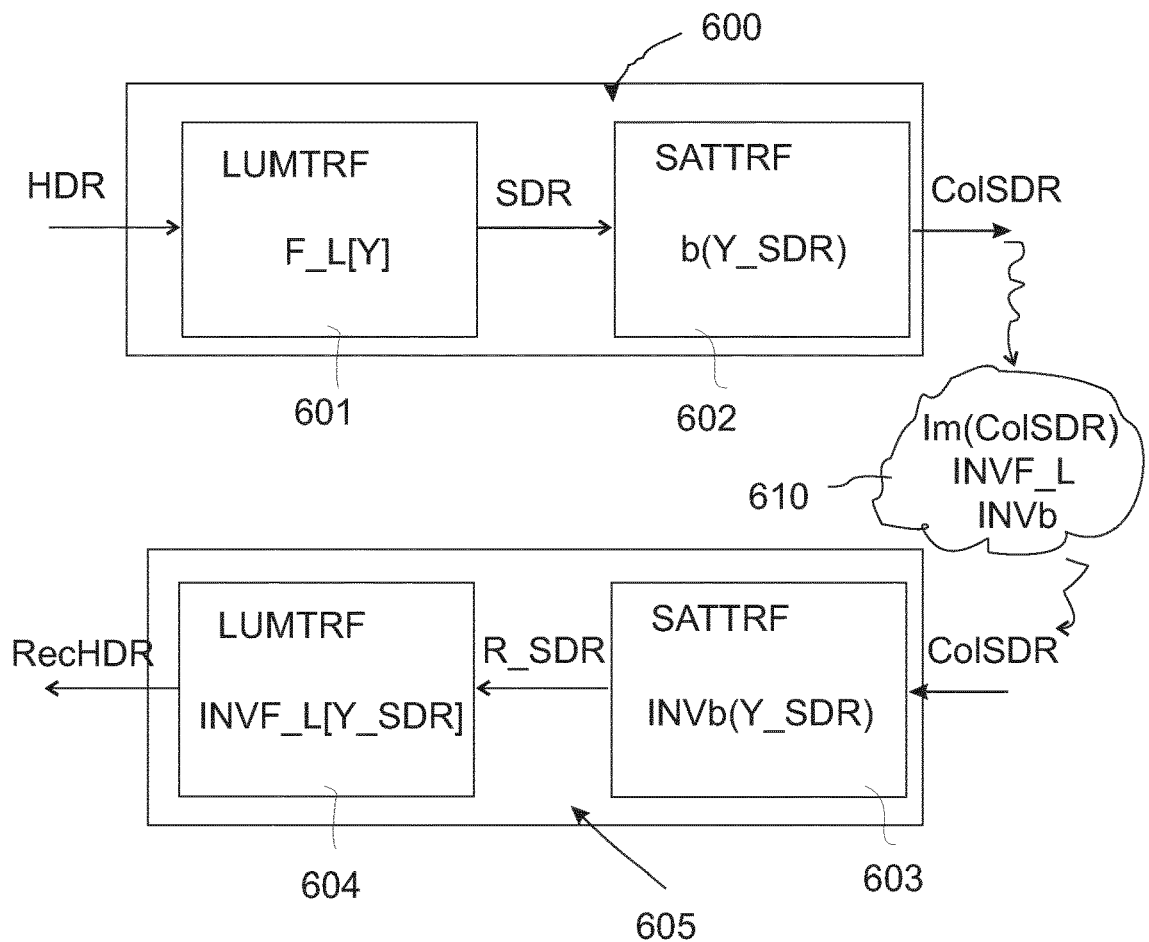
Fig. 6A
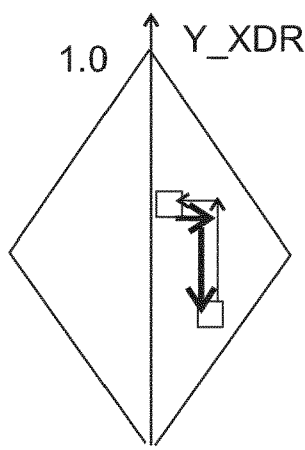
Fig. 6B
Fig. 6

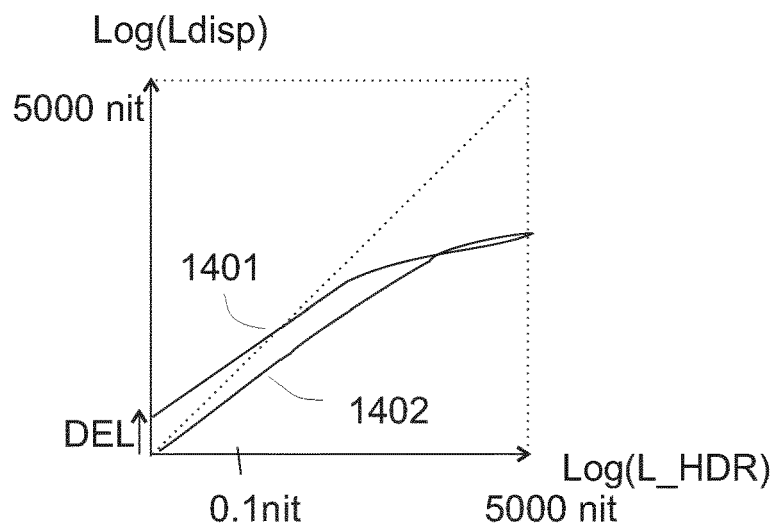
Fig. 14A
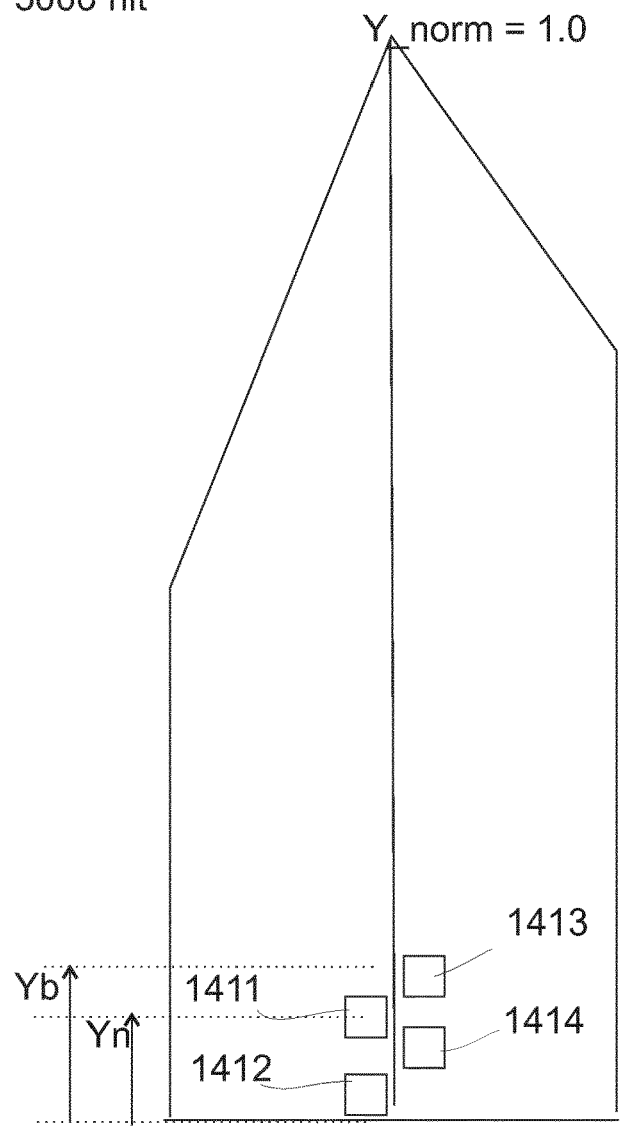
Fig. 14B
Fig. 14

OPTIMIZED DECODED HIGH DYNAMIC RANGE IMAGE SATURATION

CROSS-REFERENCE TO PRIOR APPLICATIONS

This application is the U.S. National Phase application under 35 U.S.C. § 371 of International Application No. PCT/EP2018/061280, filed on May 3, 2018, which claims the benefit of EP Patent Application No. EP 17169671.9, filed on May 5, 2017. These applications are hereby incorporated by reference herein.

FIELD OF THE INVENTION

The invention relates to methods and apparatuses for receiving encoded HDR images (i.e. images comprising pixel color codes and in particular codes encoding luminances which are significantly brighter than the luminances encodable by the legacy Rec. 709 standard or low dynamic range codec), and optimizing the colors of pixels of the images, and in particular their saturation, starting from as input an image of a high dynamic range scene, in particular a video comprising a number of consecutive HDR images, for obtaining a correct artistic look for a display with a particular display peak brightness (PB_D), as typically though not exclusively desired by a human color grader creating the image content. To clarify the concept high dynamic range (HDR) image, which should by now at this moment be understandable for any person skilled in video technology, as it is defined as an image encoding capable of codifying pixel luminances a couple of times higher than the standard maximally 100 nit low dynamic range coding peak brightness (PB_C), it can be stated that such a HDR image can contain pixel luma codes which allow the rendering of the corresponding pixel luminances correctly up to typically at least 1000 nit, or higher, on HDR displays which are capable of rendering such pixel luminances. This technology has as a benefit that e.g. the viewer can see a significant difference for sunny e.g. Mediteranean images, which would look rather dull as on a cloudy day on SDR displays, but convey the original sunny look when rendered with pixel luminances around 1000 nit or above. However, with the emergence of many different HDR displays of different PB_D, a problem occurs that not all image content can trivially be rendered, and some optimal re-grading of the image luminances to the luminances in the range which the display is capable of showing is in order. Such a re-graded optimal look of an optimized image for any particular display at a receiving side would correspond to a reference HDR look of an HDR image as graded for a HDR reference display (a so-called master HDR image), for example a high peak brightness mastering display (let's say of PB_HDR_M=5000 nit). The most optimal rendering of the reference look HDR image is actually achieved when the image of coding peak brightness (PB_C) is rendered on a display of (approximately) the same display peak brightness (PB_D). If one has a display available of lesser dynamic range, one must pragmatically optimize to an image which looks similar, but cannot give the most optimal HDR impression that one could achieve on the corresponding display (of PB_D=PB_C). Re-grading in this content means the change of the colors of the image object pixels, and in particular the luminances (or brightness appearances) of the various image objects, when determining from the input image an optimized image of a particular dynamic range, in particular but not exclusively done so by a human color grader (some embodiments may work exclusively with in-baked color mathematics in the ICs). Embodiments of the present invention are concerned with approximating the reference look when the optimized image is rendered on any actual display of a peak brightness (PB_D) which is unequal to that of the reference display corresponding to which the grading of the HDR image was done (or in other words: the coding peak brightness PB_C). The reader will understand that a corresponding look doesn't necessarily mean a look which is exactly the same to a viewer, since displays of lower peak brightness (or dynamic range) can never actually render all image looks renderable on a display of higher peak brightness exactly the same, but rather there will be some trade-off for the colors of at least some object pixels, making those pixels look somewhat different (e.g. typically the brightnesses of some image objects of the imaged HDR scene). But the optimization algorithm that calculates the optimized image for any particular display (which we call display tuning) may e.g. try to keep the hue and saturation of the pixel colors in the input and re-graded output image substantially equal for at least a majority of the pixels in the image.

The HDR image look and/or the look of the image actually communicated from a creation site to any receiver may have been created by a human color grader using technical tools to define image colors, or by an automatic algorithm using smart image re-coloring rules. In this respect the reader should understand that there are at least two categories of manners to communicate the HDR image: either one communicates the HDR image itself (together with creation-side approved functions to specify the optimal re-grading to a lower PB_D than the image's PB_C), or, a backwards compatible category communicates a SDR complement re-graded from the master HDR image instead of the master HDR image itself, and the below embodiment techniques can work in both situations. The image to be communicated may be straight from camera, e.g. a consumer camera, or from other sources like e.g. a computer graphics image of a scene. But the coded intended image as created at the creation site and the actually rendered image on a display available at any receiving site will typically look similar (as far as the display capabilities allow).

BACKGROUND OF THE INVENTION

The saturation (or colorfulness) of pixel colors is an important aspect of the look of an image. Saturation is a technical measurement of the amount of pure colors in a mixture (having energy for a particular subset of wavelengths of the visual spectrum) and the absence of other pure colors (low energy for another subset of wavelengths) or in short the purity of a color, which is indicated by a high saturation value, versus low saturation colors having a largely equal amount of all wavelengths (i.e. mixing a high proportion of neutral grey color in the mixture. The appearance to a human viewer of an object in such a look image is how strong a color is (e.g. strongly red versus weak pink), and that would typically correlate with natural properties like an amount of colorant in an animal or plant. As saturation can be used to increase or decrease the beauty of an image (viewers often prefer saturated images, although pastel images also have appeal), various apparatuses like e.g. the circuits of a television have had a saturation influencing color transformation unit, often called color control. An incorrect saturation can look weird, e.g. some colors may look bleached if too unsaturated, but also too high a saturation can look weird and cartoonish, and in particular strange for darker colors in darker, e.g. night scenes.

Applicant's inventors have started doing this research in the framework of newly developed video coding capable of handling much larger coding peak brightnesses (PB_C is e.g. 5000 nit) and luminance dynamic range than was possible with the legacy standard dynamic range coding (SDR, with fixed PB_C=100 nit, to supply correctly graded images for displays which in the recent past would always have the same display peak brightnesses around PB_D=100 nit, making things simple). Although this HDR image handling technology is primarily about creating the desired appropriate brightnesses or luminances for the pixels (the systems will be defined with luminance, but the skilled reader can understand that technically operations may actually be done mutatis mutandis on lumas Y', indicated with the prime, which are defined from the luminances by some Opto-electric transfer function as Y'=OETF(Y), e.g. a square root function, etc.), of course color being a three-dimensional physical entity means that a correct handling of saturation is also required, and one might expect that if one majorly changes the manner in which (video) images are handled compared to how this was done in the SDR era, that also how one should deal with saturation may change quite significantly, and evident beliefs may need to be re-thought.

It would be reasonable that if one builds a system allowing e.g. a human creator/grader to not only define, but also co-communicate by means of the newly developed HDR video encoding technology (the one which applicant will use for elucidating the present invented concepts by examples below, or a similar one) how the brightnesses of image objects should change when one needs to color transform a master HDR grading (i.e. the starting image(s), of "best quality" that was made for the movie or video, e.g. on a 5000 nit HDR reference display) to e.g. SDR 100 nit PB_C images for servicing the deployed market of installed legacy SDR displays, that one may also need a mechanism to change the saturation of at least some image objects or pixels. E.g. one could imagine that if one needs to relatively darken some object, e.g. to make room on the smaller SDR dynamic range for brighter objects in the original HDR scene, that one at least may make those objects somewhat more colorful, to make them punchy in the SDR look image (as just an example of a desideratum which the technology may need to be able to handle). On the other hand, darkened or brightened pixels could easily get e.g. a far too high saturation "automatically" if one designs the system technically inappropriately.

FIG. 1 gives a concise summary of the technical knowledge of saturation as a concept and saturation processing, i.e. what a video specialist would typically think about when reflecting upon the concept.

A good way to treat saturation is as shown in FIG. 1A saturation being a color component of the cylindrical HLS space (hue(h), lightness (L), saturation(S)), in which lightness is again a measure which can be defined as L=OETF2(Y), Y being the luminance. With the lightness we can make ever lighter circles of the same colors or more precisely chromaticity (h,S), which are radially spread around the lightness axis in the middle of the cylinder. The saturation is a simple measure which lies between zero (the achromatic colors or greys on the lightness axis) and the maximum saturation on the circular periphery, which is normalized equal to 1.0. So one can then define a saturation boost (b) for all colors, e.g. the shown example color 101, which increases the color saturation by moving the input color to the result color 102, which is closer to the periphery. Typically one would use a multiplicative saturation change function of the type:

S_out=b*S_in, which realizes a saturation increase if b>1, and a desaturation if b<1. The hue and the lightness (L_c) of any color should ideally stay unmodified for a pure saturation change. In such a cylindrical color representation saturation processing need not be too difficult (apart from the fact that such a color space may not be perfectly uniform). However, actual additive color systems like a RGB pixel display deviate from the perfect cylinder in the higher luminance region, as is schematically shown in 2D in FIG. 7, and that can already introduce quite some complications.

Another more pragmatic saturation change operates in luma (Y') chroma (Cb, Cr) versions of color space, as shown in FIG. 1B. Such color spaces are popular inter alia because they are the natural color space of SDR television color encoding, so, although in fact they were merely designed to be used in a simple reversible SDR image encoding, one can decide to perform any color processing in that color space. Again one moves the color 103 away from the achromatic axis of the grey colors (and their corresponding annotated luma values Y') to result color 104 by a multiplicative saturation change strategy, now multiplying on both the Cb and Cr components. For this version one could trace the saturation boost or decrease back to the television circuits of the 1960s which work on similar color representations like PAL or the YIQ space of NTSC. Such systems would boost or dim the Cb and Cr component of all incoming pixel colors by multiplying by a constant B respectively 1/B. From this it would seem reasonably straightforward how to do a saturation modification, at least in this day and age.

FIG. 2 shows merely for introducing some concepts a typical HDR video encoding and decoding chain, being an example invented by the applicant, for which type of technology the present invention would be useful to create optimally looking images at the receiving side, by an upgrade of this kind of HDR video decoding receiver. The reader may initially study the system assuming the images are achromatic, i.e. grey value images which have only luminances, but neither hue nor saturation for the pixels. Such HDR video coding technologies emerged a couple of years ago, to fill the gap that high quality images for higher PB_D displays could just not be communicated if a Rec. 709 codec was used (which can communicate only luminances between 0.1 and 100 nit)

It is further assumed now—for simplicity of understanding, i.e. without limitation for the later teachings—that the HDR image or images are actually communicated as SDR images (which are 100 nit LDR low dynamic range images), i.e. suitable for direct good-looking display on legacy SDR televisions, computer monitors, projectors, mobile phones, or the like. Bad looking images would occur if one directly displays a e.g. 5000 nit PB_C image on say a 100 nit PB_D display, according to the legacy SDR displaying mantra which dictates that the coded whitest white (i.e. PB_C) will be displayed as the brightest displayable display white (i.e. PB_D=100 nit in the example), and all other luminances will be displayed in proportion of what their relative value to PB_C was in the input image (i.e. 50% of 5000 nit gets rendered as 50 nit). If one then codes a person standing in the dark in the 5000 nit PB_C image with luminances between say 0.01 and 5 nit, which would seem reasonable luminances to display this image region on a 5000 nit PB_D image, then when directly rendering such image on a 100 nit SDR display all pixels of this person would fall below 0.1, i.e. become invisible black. So some brightening re-grading processing will need to be applied to at least those darkest regions of the image, to make them sufficiently watchable on said SDR display(s). How much one actually relatively brightens the pixels from the (normalized) HDR image to obtain the SDR image (50 times, or only 30×, or 70×) may be a matter of preference, e.g. of the human color grader creating the SDR pendant image for the master HDR image, but the reader should well understand that although we explain this aspect for full elucidation of the ecosystem, this is only a detail in our present contribution to HDR technology, which is a framework for correctly handling the saturation processing, irrespective of which particular brightening function happened to be chosen.

This relatively new recently invented system should be pondered upon for a minute by the reader: one actually communicates e.g. 5000 nit PB_C images (i.e. images which have all the many various pixel luminances making them suitable for optimal rendering on 5000 nit PB_D displays, i.e. e.g. darker indoors room luminances up to say 120 nit, but also pixel luminances of and around a light bulb up to say 5000 nit), by not actually transmitting those 5000 nit images, but by actually transmitting SDR (100 nit PB_C) images to any receiver, which can be realized if one in a suitable manner co-communicates in metadata luminance transformation functions (F_L, being a part of the totality of color transformation functions F_ct) which enable receivers to reconstruct the 5000 nit master HDR images from the received 100 nit SDR images (i.e. in the communicated SDR image the light bulb pixels have the maximally possible 100 nit luminance, but with the luminance transformation function for that image the receiver knows to reconstruct those pixels to e.g. 5000 nit HDR image pixels).

However, applicant also invented yet another system which actually communicates HDR image to receivers, via any image communication means (e.g. a cable network, internet connection, or blu-ray disk etc.), together with as metadata the color transformation functions to down-grade that e.g. 1000 nit PB_C master-graded and encoded HDR image to an SDR image, and the below teachings and embodiments will apply to that situation also.

These luminance transformation functions or in general color transformation functions F_ct may be defined by a human color grader, to get a reasonably looking SDR image (Im_LDR) corresponding to the HDR master image MAST_HDR, whilst very importantly at the same time ensuring that by using the inverse functions IF_ct the original master HDR (MAST_HDR) image can be reconstructed with sufficient accuracy as a reconstructed HDR image (Im_RHDR) at a receiving site (ergo, this is a dual criterion, making such approaches which are very different from legacy video coding non trivial).

A human grader could e.g. determine, by turning dials until the image look is according to his preference, the luminance transformation function(s) shapes (e.g. in a LUT representation) or parameters (in a parametric definition of the function shape) of the color transformation functions F_ct, which would contain at least one functional specification for transforming the luminances of the input MAST_HDR image pixels into luminances of the output SDR image (Im_LDR) pixels or vice versa (which for simplicity of understanding we can for the remainder of this teaching assume to be a gamma curve, but in fact of course obtaining the most optimal medium dynamic range (MDR) image corresponding to any master image typically contains more complex considerations).

In fact, people naïvely may think that dynamic range is only about the brightest luminance divided by the darkest luminance. Whilst that may be a good characteristic for a HDR display, HDR images require more insight. It is also about the re-lighting of certain regions of the images scene with suitable chosen functions, and about intra-object and inter-object contrasts (e.g. somebody hiding in the mist who should be sufficiently hidden in all re-graded MDR images). In fact, it can oftentimes be about finding the essence of any HDR scene, and making sure that is optimally represented by a suitably allocated range of luminances in each dynamic range image version of the master. In some cases some users, in particular content creators, of the technology may have simple desiderata, and in some cases others may have strict desiderate, but ideally a technology should be able to cope with all of that, and ideally in the most pragmatic manner (e.g. by having a first rough function which already sets predominant inter-region contrasts as desired, and based on this, in this pre-graded image, thereafter using a second function to do precise luminance re-grading of some specific image objects; i.e. the functions could be tuned for a shot of N consecutive images, or even for a specific single image). A couple of examples for the technical and/or artistic requirements of such object luminances are shown in FIG. 3, when the object luminances of a HDR image have to be optimally converted to object luminances for a SDR image with considerably lower dynamic range DR_1 (50× typically; and potentially different viewing conditions also), than the HDR luminance range DR_2. It can be seen that there may be various scenarios, which lead to different considerations, and in turn very different luminance mapping function shapes. E.g., a night scene (Im_SCN2) may be handled relatively well on the darker SDR display, and one might decide to specify in the SDR image encoding to render the darker objects with substantially equal luminance on the SDR display as on the 5000 nit PB_D HDR display, whilst creating some optimal allocation for the luminances of the lights in the available upper part of the SDR luminance range (DR_1). For the sunny Western image (ImSCN1) there may be entirely different considerations, e.g. "map the sun to the brightest possible color i.e. a white of luminance PB_LDR" and "distribute the landscape and scene object colors to sufficiently bright SDR colors", which would result in some luminance transformation function shape which maps the darker colors in this scene (e.g. the brown boots of the cowboy) to say 25 nit. Whereas the first mapping has more of an equi-luminance character, the second is more of a compressive nature, and various more complex strategies may be employed. It should be understood by the reader that any image handling system, and in particular one that is going to determine optimal saturation—optimal colors in particular saturation being a rather more complex matter than would seem prima facie—should be able to cope correctly with the various needed behaviors. The reader should be aware that this simplified elucidation of some main concepts of HDR image handling (coding and rendering) seriously underrepresents some further major complexities that exist for this novel high quality image handling, but we try to keep the explanation as simple as possible, as it is already complex. In addition to specifying only these two graded versions of the HDR scene (the SDR and master HDR image), there can be various desiderata for in-between MDR images, or even ultra-HDR images, e.g. one may always want to render a small sun as bright as the display can do, but the street light one may always want to render at 3000 nit, for any PB_D above 5000 nit.

What the reader should realize, is that instead of making e.g. 10 different MDR gradings at the content creation side (e.g. for 200 nit PB_D displays, 500 nit, 750, 1300, etc.), we enabled with our technology that the content creator needs to make only two reference (or master) gradings, which may typically be a e.g. 5000 nit master HDR graded image, and a 100 nit master SDR image, and the content receiving side can then automatically determine the good-looking, corresponding, sufficiently similar re-graded MDR image (not by receiving the two images, but by receiving one of them and the color transformation functions F_ct allowing to transform the one grading into the other, or vice versa with the inverse functions, or processing). Note that the MDR image pixel luminances will depend on the particular display peak brightness PB_D of the display available at the receiving side, and that factor is also not yet known at the creation side (which is why otherwise the content creator would need to make a multitude of images, wasting his valuable time).

But there can be various manners in which the receiving side display tuning algorithm actually calculates the MDR luminances (this can be smarter and more precise taking into account highly detailed specifics of the HDR content of a particular HDR scene image, or more roughly for customers which prefer simplicity and the associated price and IC complexity benefit over ultimate accuracy), and again that aspect is not a single limited version in our framework, but rather a variable aspect that the framework can cater for and solve the problems for, given any elected display tuning method (and below the skilled person learns how to implement it).

Although the skilled person should by now be reasonably be acquainted with HDR video coding issues and techniques, in case some readers may be somewhat less familiar with display tuning we have added another elucidating example in FIG. 16.

FIG. 16A shows an archetypical HDR image, with regions of average luminance (the robot in the flying scooter 1602 having pixel luminances spread around an average normally lit HDR luminance of 200 nit), dark or ultradark luminances like the guy 1601 in the dark room behind the window, and regions or objects of higher brightness, like e.g. the neon light sign 1604 or the shadowman 1603, which is a person seeing as a low contrast shape in a bright mist in the alley between the building on the right and the left. FIG. 16B shows how one can derive luminances of re-graded images—e.g. starting from the master HDR luminances on the x-axis—by assuming that a single global luminance mapping function shape will suffice for the re-grading luminance transformation (i.e. global meaning that whatever the spatial position in the image is, one only needs to take its HDR luminance, and the F_L_h2s function will yield the corresponding SDR luminance of the pendant re-grading on the y-axis). Note that on the y-axis we have actually copied the x-axis, so we can specify any luminance re-grading function, even the one which maps the master HDR 4000 nit PB_C luminances to a 4000 nit PB_D optimized image, which would obviously correspond to the identity transform i.e. the diagonal drawn dotted. In such an absolute luminance representation, one can understand that a mapping to a lower PB_C set of luminances, e.g. of the SDR image, will be done by a function which falls below the diagonal. One should not be mistaken that when one actually does the calculation in a normalized luminances system (because that created some insights), as we do below, the function mapping normalized (!) HDR luminances to normalized (!) SDR luminances will lie above the diagonal (the reader can understand this assuming that such luminances represent LCD pixel valve transmission percentages for a display with a fixed backlight displaying PB_D nit for an open pixel valve: if one wants to render the dark guy 1601 with assume the same luminance 1 nit on both the HDR and SDR display, one needs to brighten the normalized HDR luminance by 50× to compensate for a 50× dimmer SDR display backlight).

It should also not be misunderstood when looking at elucidating color space representations like e.g. FIG. 7, that although one could speak of "one unique set of normalized 0.0-1.0 luminances Y*", superimposing pixel luminances (or blobs of luminances and in general 3D colors from a specific object like the guy in the dark) from two differently graded images on the same color representation for ease of understanding by in no way means that those two pixel normalized luminances are normalized in exactly the same way: each one is normalized by its own coding peak brightness, so the absolute HDR image pixel luminances were normalized to fall below 1.0 by dividing those absolute luminances by PB_C_HDR=5000 nit e.g., whereas the MDR luminances for a 700 nit PB_D display-optimized image were normalized by dividing by 700, etc. But one can do color processing or specifically re-grading transformations within that universal normalized representation, and then ultimately convert to the uniquely defined absolute luminances (and chromatic components) by multiplying the normalized values by e.g. 700.

The function F_L_h2s of FIG. 16B is the luminance mapping function which specifies the related SDR luminances for the 4000 nit PB_C created master HDR image, and this is the function which will typically be co-communicated to receivers of the HDR video signal as metadata together with the e.g. SDR graded images themselves. The receiving side will determine by its display tuning algorithm a secondary luminance mapping function, the display tuned luminance mapping function F_L_da, which maps the HDR luminances not to the SDR lunminances, but in this example to 1000 nit PB_C MDR luminances (the reader may assume that the display tuning happens by first decoding the received SDR video images to the reconstructed master HDR images, and then function F_L_da is applied to those L_HDR luminances to finally obtain the optimized MDR image luminances L_MDR). How exactly this secondary function F_L_da is determined is as said a detail (to be plugged in component with many possible alternative variants) in this invention, and for his understanding the reader should just assume that said functional shape falls somewhere in between the function F_L_h2s and the diagonal. Of course a smart algorithm may want to take detailed care about the luminance mapping around 3000 nit, so that the shadowman is always nicely visible (not too plainly visible, not too misty), but even if the display tuning algorithm comes up with a function which is not so ideal, the below saturation processing framework embodiments will still work with such a F_L_da function too (it is merely necessary that there is some function F_L_h2s which establishes a relationship between any L_HDR and a corresponding L_SDR, and a function F_L_da which established a relationship between a third L_MDR and the original master HDR image's L_HDR, and then one has uniquely defined this trio of luminances, and one can also calculate L_MDR from L_SDR etc.). So there are two reference gradings of a HDR scene (in which luminances can be represented in many ways: the exposure-slicing mechanism which just does a multiplicative scaling between Lmin_clip and Lmax_clip is only a single and simple manner to generate a spectrum of different image representations of the original scene, and in general it can be more complex how to re-allocate all pixel or image object luminances in even only 2 of various dynamic range re-gradings optimally), having for each particular pixel a corresponding L_HDR respectively a L_SDR in the SDR re-graded image, and then there is a third MDR image, having a third corresponding luminance for that pixel location: L_MDR (which is derived based on re-quantifying the re-grading need, which was specified by re-grading to extreme end PB_C selections, for the intermediate luminance dynamic range capability). The reference gradings are typically created at the content creation side as a "guidance" of how the images of this particular type of HDR scene should ideally be re-graded, and the third image (and its pixel luminance(s)) is typically generated at the receiving side, because only there it is known which display needs to be supplied with the optimized MDR images (based on the capabilities of that MDR display, i.e. typically at least its PB_D, but in some higher quality display tuning algorithms also its minimum discernable black MB_D).

So, whether specified by a human, or an automatic algorithm during real-time creation of a television program (analyzing image properties to specify the color transformation functions), what is relevant for the below elucidated embodiments of this invention, is that F_ct will also contain in addition to specifying how to handle pixel luminances, at least one chromatic color processing specification (e.g. a saturation boosting function, and tuned to the specific needs of the current HDR image or successive run of images of a HDR scene), which will be assumed to be a specification of a saturation change when transforming pixel colors in a representation with a first luminance dynamic range, to pixel colors in a representation with a second luminance dynamic range, whether that be luminance upgrading or downgrading.

Returning to FIG. 2, note that instead of relying on a receiving side to invert the functions F_ct into IF_ct, one can also send already the needed functions for calculating Im_RHDR from the received and decoded SDR image Im_RLDR. So what the color transformation functions actually do is change the luminances of the pixels in an HDR image (MAST_HDR) into LDR (or in fact SDR) luminances to fit all luminances optimally in the 100 nit PB LDR dynamic range DR_1 (i.e. thereby simultaneously creating a good look for the SDR image and its object brightnesses, AND, in view of reconstructability of the HDR image(s) by any receiver in this function dual look image encoding paradigm, ensuring the reversibility of the HDR-to-SDR range compression).

A typical coding chain which is suitable for deploying in already existing or pre-agreed parts of the video communication technology as shown in FIG. 2 works as follows. Some image source 201, which may e.g. be a grading computer giving an optimally graded image, or a camera giving a HDR output image (tuned by the camera operator with some dials and buttons) etc., delivers a master HDR image MAST_HDR, to be color transformed and encoded by an image or video encoder 221. A color transformer 202 applies a determined color transformation (according to the elected suitable color transformation functions F_ct, which we will assume are at least one luminance changing function, and one chrominance or chromaticity changing function, typically one after the other, the order being interchangeably in several embodiments, and as said e.g. optimized by a human color grader), e.g. for the luminance a convex bending function, which for simplicity of elucidation we will for now assume to be a gamma function with coefficient gam=1/k and k a number larger than 2.0, and for the chromatic processing e.g. a desaturation with b=0.9. Of course more complex luminance mapping functions may be employed, and indeed in practice they are, provided that they are sufficiently reversible, i.e. e.g. the Im_RHDR image has negligible or acceptable banding, or other color errors. By applying these color transformation functions F_ct comprising at least luminance transformation functions, an output image Im_LDR is obtained.

This image is now at least for some technology, like a DCT-based video encoder, just as if it was a legacy SDR image, because it may be characterized e.g. by 8 or 10 bit Rec. 709 YCbCr pixel colors. This allows as a second step that the image or set of images is compressed for communication with a legacy LDR image compressor (203), which may potentially be modified somewhat, e.g. the quantization tables for the DCT-ed transformations of the prediction differences may have been optimized to be better suited for images with HDR objects in them (although the color transformations may typically already make the statistics of the Im_LDR look much more like a typical LDR image than a typical HDR image, which HDR image typically has relatively many pixels with relatively dark luminances, as the upper part of the range may often contain merely small lamps etc.). E.g., a MPEG-type compressor may be used which is assumed for explanation without limitation to be a HEVC (H265) compressor, yielding an encoded SDR image Im_COD. So this image or video compressor 203 pretends it gets just a normal SDR image, although the difference is that it now also gets the functions F_ct which allow the reconstruction of the master HDR image, i.e. effectively making this a dual co-encoding of both an SDR and a HDR look, and their corresponding set of images (Im_RLDR, respectively Im_RHDR). There may be several manners to communicate this metadata comprising all the information of the functions F_ct, e.g. they may be communicated as SEI messages, which is a mechanism which was also developed previously in AVC or HEVC for communicating any useful additional information relating to the video images. The manner in which such aspects are embodied is of course not critical for the below teachings, therefore for enabling the reader to sufficiently understand the background and full picture of HDR image handling, and the new invention related thereto, only some typical example is given. Subsequently a transmission formatter 204 applies all the necessary transformations to format the data to go over some transmission medium 205 according to some standard, e.g. a satellite or cable or internet transmission, or BD disk, e.g. according to ATSC 3.0, i.e. packetization of the data is performed, channel encoding, etc., whatever is needed for those pre-existing or future version image or video communication technologies.

At any consumer or professional receiving site (e.g. a television STB in a viewer's home, video conferencing, commercial video wall, etc.), a receiver 206, which may be incorporated in various physical apparatuses like e.g. a settopbox, television or computer, undoes the channel encoding by comprising an unformatter arranged to apply unformatting and e.g. channel decoding. Then a video decompressor 207 of a video decoder 220 applies e.g. HEVC decompression, to yield a decoded LDR image Im_RLDR (i.e. with exactly the SDR look that was graded at the creation side by applying the color transformation functions F_ct to the MAST_HDR image(s)). Then a color transformer 208 is arranged to transform the SDR image to a 5000 nit PB_C reconstruction image Im_RHDR of the 5000 nit original master image Im_RHDR, by applying the inverse color transformations IF_ct of the color transformations F_ct used at the encoding side to make the Im_LDR from the MAST_HDR.

The above explained system could be a basic HDR video coding/decoding chain, but in general for a professional system more technology is needed.

Recently a number of HDR video encoding technologies have appeared. Some inventors consider it sufficient to merely encode HDR video (which mere translation of luminances to luma code values should be a reasonably simple thing to do, with not too many technical surprises and problems popping up), which they define with a fixed PB_C of e.g. 1000 nit. This would seem indeed all there is to it, because one can define for the pixels any luminances between say 0.1 nit and 1000 nit at the creation side, and then via some communication coding (or storage codec) mechanism, communicate the video images so that at the receiving side corresponding 0.1-1000 nit luminances can be rendered. Applicant's inventors realized that a good HDR experience is not just about exactly rendering particular physical luminances. In particular, having such a mere coding and decoding approach means that users having legacy SDR displays installed (or they may have a high quality 1000 nit PB_D display at home, but may want to switch to mobile viewing while they have to walk to another room temporarily) cannot trivially have reasonably looking images on their display. I.e. if they use any technology which communicates HDR scenes by solely communicating HDR image(s) encoded in the supposed to be SDR HEVC image code containers (whereby the reader should understand that the amount of bits is not a reliable predictor of the dynamic range of an image, because the 10 bit luma-plane could contain both lumas of a SDR image, or any PB_C HDR image, as that is just a matter of quantizing the HDR luminances when normalized to Y_max=1.0, i.e. a question of with which maximum to be rendered luminances PB_C the maximum luma code corresponds), which is what proponents of that sole HDR communication technology supply, it is unclear what the SDR display will need to do with that inappropriate HDR image. Whatever is the OETF used for creating HDR lumas, and however those would be interpreted (e.g. with the wrong Rec. 709 EOTF), such SDR viewers will typically see most of the image too dark, and probably hardly discernable (and sometimes the viewer will even see much of the darker regions too bright, but in any case it is wrong, and not clear what will happen, and such important semantic or emotional aspects of a movie like e.g. the suggested time of the evening in which the action happens, with the sun a certain angle under the horizon leading to a certain darkness impression, will typically go wrong). One can understand this even when converting to luminances, and then e.g. doing the typical rendering, which, as one might think is quite reasonable at least the first thing one would think of, (always) maps the brightest content in the image to the brightest white the display can make, ergo PB_C to PB_D.

A legacy SDR image (i.e. prepared correctly under the old video expertise) will have most relevant colors in the scene nicely lit to have luminances around 18% of the diffuse scene white, which means that most colors will render nicely bright just below the maximally bright display color, PB_D, which for legacy displays would be 100 nit. For normal dim television viewing, that would mean that most of the colors are rendered nicely bright, indeed, the rendering may even be seen as somewhat self-luminous (lightbox effect compared to e.g. a printed poster in the room). Human vision has developed to see the greyness or lightness (reflectance) of objects in a region, which in a natural scene containing reflecting objects usually would be reasonably uniformly lit. That means e.g. that colors below +−5% of the local white, or at least below 1%, are just seen as blacks, and typically less interesting. The viewer may adapt his visual system to the white of the television. And what then happens is that he sees a nice ("schematic") rendering of the actual scene, in a reasonably high quality manner so that after half a century of SDR image viewing most people even don't realize anymore that there is something wrong, let alone what HDR would technically need. The problem is now that because of the high dynamic range of the imaged scene, the darker regions are relatively much darker than the brighter ones. E.g. the brightest point in the HDR image may be a pixel on the surface of a lamp, which may be e.g. 5000 nit in the HDR master grading, whereas the brightest pixel of the other objects in the night scene may e.g. be only 10 nit. This is a factor 500 (!), which means that if one would render this in a PB_C-to-PB_D philosophy on a SDR display, everything interesting of the night scene would fall in the deep blacks, ergo, some correction solution is essential.

Similar problems happen for any viewer having a viewing situation which reduces more to a SDR viewing scenario than originally intended, more than what the master grading was intended for, e.g. because of significant illumination in the viewing environment. This factor was not taken into account by mere HDR video encoders, and is actually what is currently being complained about.

The good thing about the SMPTE ST.2084 EOTF-based sole HDR coding, is that it uniquely fixes a view on HDR content creation, by having an absolute framework for color graders to now uniquely define their look on any HDR scene: they can specify for each object, even each pixel, what luminance it should have, on an extended luminance range e.g. extending down to 0.005 nit and up to 5000 nit, so there is a possibility to specify (and render if the display is capable to do so) quite dark and quite bright image objects. Such a reference framework, actually a reference theoretical display luminance range, was needed to start further technical development. However, a disadvantage which was not readily recognized is that this creates a rather rigid standard view on HDR coding and handling, because it is merely a manner of coding luminances for a fixed rendering environment (the 0.005 to 5000 nit of the grader's display in the grading room), and it specifies nothing about how those images should in the end be used, knowing that most people will watch TV in a situation which can be markedly different from the viewing situation of the content grader. The latter, a good quality movie or program for the end viewer, is what is the really important factor.

In previous years some companies have started to research and publish (see WO2007082562 [Max Planck], a teaching of a two-image method with a residual layer (i.e. in fact a second image), and WO2005104035 [Dolby Laboratories]) encoding systems which do allow to communicate two different dynamic range gradings of the same HDR scene, namely some HDR image of that scene (e.g. with PB_C=10,000 nit) and a legacy SDR image (PB_C=100 nit), which can then be used for rendering a good equivalent re-grading of the HDR scene on legacy SDR displays. The reader can for his easy understanding imagine that the SDR image (which can with Rec. 709 OETF only encode a 1000:1 luminance dynamic range) contains a coding of the surface colors of all scene objects, and the second image is some boost image containing an illumination non-uniformity for the scene (e.g. if the "uniformly illuminated" object is brightly lit, the per pixel luminance boost second image will contain a value e.g. 50, and if that object happens to be in the shadow its luminances will be multiplied by e.g. 1/10). That would indeed already solve the problem that images with an inter-region contrast ratio of 500:1 as the above-mentioned night scene, could be better rendered on a SDR display, because one could move the two objects (lamp and dark street objects) closer together in their relative luminance, which typically corresponds to making a SDR grading which has brightened dark street colors e.g. between 0 and 20 nit, and the street light is then only somewhat brighter, e.g. at PB_D=100 nit (effectively reducing the inter-object contrast to 5:1 rather than 500:1, but the lamp still looks somewhat lit compared to the rest of the image, so the impression is still somewhat reproduced, at least as far as it can on a display with PB_D=100 nit).

However, applicant feels that such a dual graded image communication, i.e. which offers one image suitable for 5000 nit PB_D HDR displays and the other SDR image suitable for legacy 100 nit PB_D displays, is still is not enough for a versatile good quality HDR handling system (since ideally we want to service all possible display scenarios with an optimal use of any image or video content, such as e.g. portable or large screen display watching outdoors, projection in museums or hospital rooms, etc.) and that hence more technical components as solutions are needed. As said, it is not just about being able to encode HDR luminances as e.g. 10 bit luma codes, but ultimately about being able to optimally present them to a viewer, because otherwise a higher dynamic range image might even look worse than a lesser dynamic range image that is particularly well-rendered. In contrast with simple legacy SDR images, one now has HDR images, i.e. comprising high quality content of potentially very different luminances (i.e. not already pre-optimized like SDR images, but quite variable), and the question is then how this content should be optimally handled and in particular rendered on any possible display present at a rendering site, which in general will also be a content-dependent question (as there are technically and/or semantically very different HDR scene types possible). Introducing more such market requirements will however also lead to more technical complexities, and new problems popping up, for which suitable new technical solutions have to be invented.

Applicant's inventors realized that most of the situations will, even when disregarding the viewing environment and the luminances of objects surrounding the display but being in the visual field of the viewer, have the problem of the display peak brightness PB_D of the actually available display not being equal to the image coding peak brightness PB_C (i.e. PB_C corresponding to the ideal reference display for which this communicated image was color graded, and on which it would look optimal, whilst on deviating displays it would look suboptimal, e.g. much too dark). So the color transformer 208 will typically not only be arranged to merely reconstruct an approximation of the original MAST_HDR, but will also have a color tuning unit 209 arranged to calculate what will be called herein medium dynamic range images (MDR), which are e.g. optimized (to give the most fair impression of the actual HDR scene) for say a connected 800 nit PB_D display (210) where the master HDR image was PB_C=5000 nit, and either communicated as such a 5000 nit PB_C encoded image, or a PB_C=100 nit SDR image. This is because some applications don't need a reconstruction of the original 5000 nit (master) HDR look image, because they can e.g. only display on a 1500 nit PB_D display anyway, so what is actually needed is the so-called display tuned (aka. display adapted) image for that display.

In both cases the actual communicated images will be supplemented with color transformation function(s) F_ct which specifies how one should, e.g. according to the artist who created the content, re-grade the content at least from one of two far apart dynamic range situations (e.g. the SDR peak brightness and dynamic range) to the other extremity (HDR), on a range of possible display peak brightnesses PB_D. According to applicant's inventor's insights, that would also convey the for the particular image content typical re-grading desiderata for in-between MDR images (note that the name medium dynamic range does not discount that one could also re-grade to a PB_D outside the range of those far apart two typical gradings, e.g. for a 7000 nit PB_D display in case 5000 nit PB_C content is received). And this without the creation side, i.e. e.g. the human color grader (or an automatic luminance re-grading function determining apparatus), needing to specify many functions for various in between PB_D MDR display re-gradings, because the receiving side would determine the optimal MDR images from the received functions F_ct by itself.

That may prima facie seem to be a mere matter of receiving the color transformation functions (i.e. the F_ct which e.g. created the actually communicated SDR image from the master HDR image of the creation side), and doing the inverse color transformation (on the received SDR image, to obtain the optimal MDR image which is needed), but, only after having reduced the (to be applied in the MDR image calculation) luminance boosting function compared to the one actually received in the F_ct metadata, because one has to brighten a 100 nit SDR image to a e.g. 800 nit MDR image, instead of e.g. a 5000 nit HDR image (although the reader may understand that in practice the tuning may be much more complex and more complex calculation procedures may be applied than the one for elucidation of the principles here, since displays may have quite variable capabilities, and to optimize intra-object contrasts with inter-object contrasts of the particular HDR images and for video even inter-scene contrasts given the very different properties of the HDR scene—such as how late in the evening a scene should look from the balance between skylight and artificial light—quite complex luminance mappings could be used, instead of the simple gamma for just elucidating what happens generically). Or alternatively formulated in a normalized to 1.0 color space, in case the MAST_HDR had PB_C=1000 nit, and this data is actually communicated as SDR lumas or corresponding luminances, on a relative luminance axis of a relative gamut which puts any display peak brightness to 1.0, one would need to transform the SDR relative luminances into HDR relative luminances by applying a 10× relative dimming of most of the SDR image objects (e.g. the dark night objects), to get a similar look on a 1000 nit PB_D display with a 10× stronger backlighting (i.e. since the image controlling the LCD pixel transmissions is multiplied by the backlight value to obtain the final display-rendered luminances, in case we use a LCD as elucidating model, one must dim the LCD pixel transmission percentages by a factor 10, or the corresponding luminances in the driving image going to the display, if one wants the same look as on an SDR display for a 10× brighter backlight HDR display).

So (even sticking to the for elucidation simple luminance mapping function F_L being a simple gamma function) one would think one just needs to lower the gamma function for realizing the SDR-to-HDR prediction (as communicated in the F_L function shape) as a now SDR-to-MDR color transformation, and then apply the also co-specified chromatic saturation transformation for transforming between the lower and higher dynamic range image, and that's all there is to it. That may be all there is to it when one has colorless grey value images, but it is not so simple when color is involved.

In fact, one might think of simply applying the old decoding paradigm: "the decoder just undoes everything the encoder did in reverse order, to obtain the reconstruction of the original (master HDR) input image (except for some rounding errors of lossy compression)". So suppose we have a decoder which follows the color processing order of FIG. 5A, i.e. which does first the luminance transformation as indicated (by the received luminance transformation function shape F_Lt, e.g. communicated as a LUT, in the simplistic example being a mere gamma function), to achieve already the correct luminances of all pixels in the output image, and then the chromatic color correction, which we assume is a saturation boost/reduction function, again with the precise needed function F_sat being communicated in metadata. Because the gamut of a display has a rather complex shape, in general this requires different color behavior in the lower part of the gamut where the darker colors reside, than in the upper tip, where the gamut squeezes towards white, and for which brighter colors the display (or even an RGB coding) cannot realize all colors, in particular certain chromaticities with high saturation. Therefore a somewhat more or lesser complex luminance-dependent saturation transformation function may be employed, as taught in Wo2014/128586 FIG. 15a, which teaches a general method of how one can squeeze colors in a gamut by specifying a saturation transformation function. One can imagine that if one raises in FIG. 5B the color indicated by the square with a T1 which is too high, that one ends up outside the achievable gamut, however, with an appropriate desaturation towards the achromatic axis the output color should be okay again. Here one should note a difference between systems which communicate HDR images per se and only need to down-grade, and systems which need reversible reconstruction from a received SDR image to the reconstruction of the master HDR image. In the former case more severe color errors may be allowable. One should also understand that color mapping is not a unique exact science, in particular in the upper part of the gamut, where some optimization hence approximation is needed anyway. So designing improved color algorithms is not necessarily about making something which works theoretically so as to give zero color errors whatsoever, but rather one should compare with other HDR color processing, e.g. HLG introducing severe saturation errors in the upper area of the gamut, but also in the lower area.

One should note that if the RGB primary chromaticities of the input and output image are the same, both images (i.e. despite their different PB_C used in their normalization) will actually have the same normalized gamut shape (which makes it somewhat easier to understand what is happening). But there still is a problem because colors that may be relatively dim in the HDR image (i.e. where the maximum saturation in the triangle of RGB is possible; i.e. the colors residing in the bottom part of the gamut diamond of FIG. 5B), may be bright in the SDR corresponding image, hence, one would need to do some saturation decrease, because otherwise such bright colors are impossible, in the narrow gamut tip right below peak brightness (and also the MDR colors may possibly be implausible). In general one may also do a correction of the saturation for reasons such as that another color processing introduces errors, or because a different saturation for some colors yields an artistically more pleasing result, but as regards the technical aspects the reader may assume that there is just some color processing specification, typically a set of multipliers which can vary over the range of normalized luminances b[Ln] or normalized lumas b[Yn] (where one should still mind carefully that this luminances or lumas may correspond to entirely different absolute luminances in nit, depending on about which image representation we are talking about).

This way of decoding would then correspond to a mirror encoding (as long as the encoder specifies all the things the decoder needs to do, the image would come out correctly, that generic principle is still always true). At the content creation side, the e.g. human grader first mapped the colors to some suitable SDR chromaticities, with a saturation processing unit, and then wrote saturation function he used in the (SEI) metadata. Then he optimized the brightnesses of those pixel colors, and wrote the luminance mapping function shape in another SEI message. So the only thing the receiver has to do to reconstruct the HDR scene image is just inversely apply the two received color processing functions (first a luminance transformation, and then the re-saturation).

However, when actually in depth researching and designing such a novel system according to the novel market pragmatic needs philosophy, one stumbles (by first seeing things work perfectly many times, and then suddenly not) on an essential problem that this is not quite the way to build a good HDR (de)coding/handling system yet.

Namely, one can imagine that indeed one could design various methods, of better or worse visual quality for the luminance mapping, but then if one wants to do some chromatic i.e. saturation transformation, one has a problem (and because of the very variable types of HDR content, not necessarily a problem that is quickly discovered, let alone understood, as some types of HDR scene image may behave more pleasantly and tolerantly under a particular algorithm's processing than others). More precisely, the saturation processing F_sat was specified for an exact SDR-to-HDR reconstruction (in case nobody would ever desire anything else), but this is not what is actually to be done for the SDR-to-MDR tuning! The philosophy of mere coded image data reconstruction, with the inverse-decoding paradigm may be understandable, but now with the present status of optimal HDR image handling we suddenly have an additional problem: the need for optimal display tuning, coupled to the fact that the content creating grading only has time and desire to make one specific, standardized re-grading from whichever reference HDR representation he uses to SDR, with those corresponding color transformation functions.

So an essential element of the creator's specification of the look is clearly missing, and one cannot at that real-time of actually rendering on any receiver-side display start asking the grader to supply more information regarding particulars or needs of the MDR PB_C=800 nit look image. We'd like to again emphasize this important point: ideally the grader would make images for all rendering dynamic range situations, but for pragmatic reasons our HDR handling philosophy needed to take the important short cut of grading only two (or at least a few) different dynamic range images. But then also data showing how to re-grade to various MDR situations should somehow be used. This is a major and probably for many people difficult to understand shift from the SDR era, in which "all color information (ever needed) is in the color triplets of the image pixels", to "at least as much information about the actual HDR scene if not more is in the functions in metadata". The receiving side somehow needs to optimally use all this re-grading information, to obtain good MDR images. One could as a metaphor imagine that the HDR scene is a 3D image where now the luminance direction behaves as some equivalent of depth, and in such scenarios the reader would understand why one does add additional information to the pixellized images, namely a depth map or something like that, to make the actual scene description complete, so that at a receiving side one can calculate other 2D directional views.

So, having all the teachings on coding and luminance behavior available, some at least pragmatic solution still must be found to be able to do the display tuning with good quality, i.e. following the artistic desires of content-dependent semantically appropriate (to this particular HDR scene, e.g. a sunny outdoors+dim indoors image) re-grading according to the content creator as defined in the received color transformation functions F_ct, for any available display situation at a receiving site. Applicant spent quite some time recently on designing how one should or could do such luminance tunings aka. re-gradings, i.e, which luminances the pixels of the MDR image (scene objects) should have, following a number of technical principles, as this is the main objective of (luminance) dynamic range reduction, and one can and may want to do this as the principal first part of into what output colors the input colors should be transformed, and all these various optimization choices for the luminance allocation of various image regions, will lead to complexities in the following processing part, in particular the chromatic (non-brightness) processing. Without diving into many complex details of what various situations a new framework must be able to handle, the reader can get some idea of the many issues and possibilities by looking at the MDR image generation metaphorically as a person needing to stand in a middle-sized box: in the big HDR box, he can just stand without any trouble, and assuming the SDR box is quite small, he needs to bend both his knees and head. However, for some kind of MDR box, he may then either stretch his neck, or his knees, so there may be further considerations leading to the optimal choice. Furthermore, in some embodiment circuit topologies, such chromatic post processing is equivalently needed as chromatic pre-processing, which optimizes the allocation of MDR chromaticities, by transforming e.g. the SDR chromaticities, and hence one could try various things (as the chromatic direction can be seen as largely independent, though typically not fully independent, of the brightness dimension and its requirements, one could have various approaches). In any case one would need to come up with some pragmatic (usually simple otherwise it can or typically will not be included in affordable video processing ICs) yet universally applicable technique for doing the saturation transformation as needed for such MDR images, if one assumes that the hues of the colors will in general be identical in all dynamic range images. That is not a trivial task, and it needs a new look at things, in particular, at saturation (or in general chromatic, e.g. 2D matrix) processing.

The reader should also understand that there may be a (e.g. customer-demanded) need to actually do the processing in various manners: in various color spaces but also various manners to do the transformation paths through the color spaces. There are some variants in which one could design such a variant which does some prenormalization of the chromaticities which would still reasonably work with a subsequent determination of the MDR luminance, but there are also scenarios which will have more problems, e.g. the subsequent luminance processing in a decoder which uses max(R,G,B) as a luminance correlate in its luminance processing after a b[max(R,G,B)-Y]-based saturation processing behavior, which two dimensions are quite interesting for doing good color handling but have the problem of not being nicely orthogonizable (which means in practice that everything goes well until one wants to start doing display tuning, and similar issues appear in the other variants).

So a generic smart handling mechanism is needed for this major problem that once having a determined a (display tuned) luminance processing, the saturation processing is not that trivial that it doesn't need quite some care and an inventive new handling framework.

Note that a tangentially (un)related prior patent application of applicant is WO2015/124754. This relates to a definition of a new color space called Crayon color space, and the color processing therein, which is similar to the cylindrical color space of FIG. 1 except for a tip at the blacks which shrinks towards the white chromaticity. Although saturation processing is possible in this color space, no relevant teachings are given regarding how to do that in case of display tuning (certainly not by taking into account as presented below a secondary luminance to determine an entirely new saturation behavior in particular a new saturation boost function shape), and part of the reason why this is so is because it is also relatively more easy to do a saturation processing in Crayon color space than in e.g. a Y'CbCr space, as one can e.g. use some simple gamut mapping heuristic for colors in the part of the tip (depending also on what color approximations one is prepared to define).

SUMMARY OF THE INVENTION

To aleviate the above problems of calculating good colors for display tuning scenarios, we have developed a very useful apparatus (400) for processing a color saturation (C'bL, C'rL) of an input color (Y'L, C'bL, C'rL) of an input image (Im_RLDR) to yield an output color (Y'M, Cb'M, Cr'M) of an output image (Im3000nit) corresponding to the input image, which output image is a re-grading of the input image characterized by the fact that its pixel colors have a different normalized luminance position (Y2) compared to the normalized luminance positions of the input colors (Y1), the normalized luminances being defined as the luminance of a pixel divided by the respective maximal codeable luminance of the image's luminance representation, whereby the ratio of the maximum codeable luminance of the input image and the maximum codeable luminance of the output image is at least 4 or larger, or $\frac{1}{4}^{th}$ or smaller, the apparatus comprising:

a receiver (206) arranged to receive a luminance mapping function (F_L_s2h) defining a mapping between the luminance of the input color (Y'L) and a reference luminance (L'_HDR), and an initial saturation processing function (F_sat) defining saturation boost values (b) for different values of the luminance of the input color (Y'L);
  a display tuning unit (1009) arranged to calculate a display tuned luminance mapping function (F_L_da) based on the luminance mapping function (F_L_s2h) and at least one of a display peak brightness (PB_D) and a minimum discernable black (MB_D);
  a luminance processor (401) arranged to apply the display tuned luminance mapping function (F_L_da) to determine an output luminance (Y'M) from the input luminance (Y'L) of the input color; and
  a saturation processing unit (410, 411), arranged to map the input color saturation (C'bL, C'rL) to the color saturation (Cb'M, Cr'M) of the output color on the basis of a saturation processing strategy which specifies saturation multipliers for the normalized luminance values (Y_norm);

characterized in that the apparatus further comprises a saturation factor determination unit (402) arranged to calculate a final saturation processing strategy (b; Bcorr) based on the initial saturation processing strategy (F_sat) and based on a secondary luminance value (Y'_H) which is derivable from the output luminance (Y'M) by applying a luminance mapping function (F_M2H) based on the luminance mapping function (F_L_s2h), and wherein the saturation processing unit is arranged to calculate the color saturation (Cb'M, Cr'M) of the output color by applying the final saturation processing strategy (b; Bcorr).

This framework is tuned to allow various technical differing criteria for calculating the display tuned luminance mapping function (e.g. go somewhat quicker to the HDR look and corresponding scene object luminance distribution as the display peak brightness capability increases above 100 nit towards e.g. 1000 nit), but once a strategy has been fixed (e.g. in a TV), then the relation between the original luminance mapping function between the two reference gradings, HDR and SDR as they were graded as desired at the content creation side, F_L_s2h or F_L_h2s depending on which of those two graded images is actually communicated to receivers, and the display tuned luminance mapping function F_L_da is fixed, so the problem of complementary chrominance or chromaticity optimization of the display tuned MDR image can be handled according to the present invention according to any embodiment. Normally a saturation processing would map the input chrominances C'bL and C'rL, which are e.g. in the SDR image communication variant of HDR image communication defined in the normalized SDR colors gamut, to the MDR chrominances as output, and then a functional relationship between such a MDR and SDR needed saturation correction would be needed, however, the creation side has communicated only a SDR to HDR saturation strategy.

A secondary luminance, which is the missing one of the trio SDR, MDR, and HDR luminance can be calculated at the receiver as shown below in various exemplifying embodiments, and (although this derivation of the secondary luminance is actually used for the chromatic processing part of the color processing of the SDR to MDR or HDR to MDR re-grading) this HDR luminance will be based on the relationship between luminances per se, i.e. in the way this particular HDR scene image(s) needs luminance re-grading to happen as communicated from the creation side by the F_L_s2h or F_L_h2s function shape in metadata.

Thereto a luminance mapping function F_M2H can be calculated which gives a relationship between the MDR luminance and the needed secondary luminance, which is a HDR luminance in case the input luminance is an SDR luminance. As shown below, a preferred function F_M2H based on the function F_L_s2h is the function F_L_s2h itself, which creates a somewhat darker HDR luminance than the HDR luminance which was established at the creation side. Another reasonable choice for embodiments is to use the original HDR luminance as it was established at the content creation side. The skilled reader understands if one can establish a display tuned function to calculate the MDR luminance from the received SDR luminance, how one can determine the complementary function to create the (original, reference) HDR luminance from the MDR luminance where needed (which is the scaled further continuation of the display tuning function, see FIG. 16B: not the luminance multiplier which maps a starting HDR luminance to the MDR luminance on the curve F_L_da, but the multiplier of said y-coordinate on the F_L_da curve and the y-coordinate on the F_L_h2s curve, and corresponding with a mapping in the reversed direction which starts with SDR luminances; practical examples may do this calculation quickly e.g. as the A_L^(1-P) example of FIG. 10, but it should not be too difficult to see that if one has three curves relating a trio of luminances as 3 respective y-coordinates for any given x-coordinate, namely the identity curve and F_L_s2h and F_L_da, that the skilled person can make LUTs containing the multipliers to calculate one luminance of the trio starting from another one as elucidated with FIG. 7).

As explained above, although one would prima facie consider it possible to process the chromatic components (i.e. chromaticities, or their corresponding chrominance representation) of the input colors to get the correct output colors by a saturation processing which depends at most on just one luminance (typically the input luminance of the pixel being processed, or alternatively a luminance corresponding to that, i.e. typically the output luminance of the image which is currently calculated to be optimal for its use, i.e. rendering the best image corresponding to the original content-creation-side graded image(s) of the HDR scene, for the presently connected actual display), however, making the correct colors for some different grading situation, such as making an optimal image for an MDR with a peak brightness for which no image was graded at the creation-side, seems to be quite tricky ab initio.

Therefore, the saturation processing part, typically embodied as a saturation factor determination unit (402) doing as a calculation prior to the actual boosting of the saturation (e.g. of the chrominances Cb and Cr by multipliers) the calculation of the needed boost factors b, will need to take into account a secondary luminance value for this pixel, which functions as a corrective luminance, which indicates to which extent the saturation boost specification should be altered, for this now new special situation, of e.g. a MDR display peak brightness, which was not known at the content data creation-side, i.e. for which the saturation processing strategy F_sat could never have been exactly optimized. It does however prove in practice that such a dual-luminance approach can solve the difficulties, and yield the correct (or at least a reasonably close approximation in general) MDR image colors, not just as regards their luminances, but also their color saturation (and the hue typically being substantially identical in all gradings of the master image).

How embodiments will do the calculation of the b-factors which are needed for the multipliers 410 and 411 which ultimately implement the calculation of the correct MDR chrominances (or equivalently one can design an IC topology performing the same on other color coordinates of other color representations, such as e.g. chromaticities, but the YCbCr representation seems to be a preferred one in the field of video color processing), e.g.: The apparatus (400) may be further characterized in that the secondary luminance value (Y'_H) is used as an input coordinate of the function initial saturation processing function (F_sat) as received to get a multiplicative factor (b) as the value of said function for that input coordinate. Ergo, in this case the saturation boost values function is used as it is inputted (on universal normalized luminances, although the position of any particular pixel luminance may be "wrong" in the MDR image calculation scenario), i.e. with the shape F_sat [Y_norm] it happens to have as communicated, but the correct position to lookup the needed b-factor for this pixel is determined as this HDR luminance. This is useful for certain calculation topologies.

Alternatively the apparatus (400) may be further characterized in that the secondary luminance value (Y'_H) is used to calculate a new output coordinate of the final saturation processing strategy (b; Bcorr) for each possible normalized luminance of the input color (Y'L). I.e. in this variant a new shape for the F_sat function is calculated, with different y-coordinates for each input normalized luminance/x-coordinate. This is useful for embodiments which have a chromatic processing component which wants to directly read out which saturation boost factor is to be sent to the multipliers based on the luminance of the input color, such as the preloading example of FIG. 12.

After further research it was found by one of the researchers that the same technique which could be applied for mostly determining a good luminance squeeze for the brightest colors when re-grading to an image of lesser coding peak brightness PB_C, could similarly be used for improving the dark colors, e.g. when such colors need brightening in case a viewer watches the image(s) in a relatively bright viewing surround.

In fact, although in principle more complex saturation or even chromaticity processing embodiments can be designed according to the same principles, it is pragmatically useful to see the saturation as a multiplicative boost (or dimming, depending on the needs for the image, inter alia whether a higher dynamic range image needs to be converted into a lower dynamic range image or vice versa). However, as research shows, though such a formulation of the solution may be done, because of the complexity of luminance dynamic range re-grading, such a multiplication factor b may typically vary with the normalized luminance (because of the complex pointed shape of the RGB gamut), and typically in a content-dependent manner (e.g. whether there are bright saturated colors, like in stained glass windows or colored lamps). I.e. a saturation specification F_sat will typically be communicated from the creation side (although in principle some embodiments could generate it at the receiving side itself), with the appropriate boost factor b[Y] for each possible normalized luminance (in e.g. the SDR intermediate image of which already the luminances have been converted to their appropriate normalized values for the MDR image). So the first luminance of the two luminances determining the ultimate saturation processing strategy will be used as an input or index of the function (assume e.g. embodied as a LUT) of how bright the current pixel is, and which saturation change is needed for such brightness. But as said, a secondary luminance is needed as a situation correction determining luminance, which guarantees that ultimately the correct saturation boost is done for this particular situation (i.e. e.g. calculating a 1700 nit PB_D MDR image for a 5 lux viewing environment, or a 3000 nit PB_D MDR image for that same 5 lux viewing environment, or for a 500 lux environment, etc.).

As explained typically one of the two luminances is a before-a-luminance-mapping (F_Lt)-luminance and the other one of the two luminances is an after a luminance mapping-luminance, where said mapping is performed by a different color processing sub-unit which performs the luminance transformation, and may timing-wise ergo processing flow-wise be performed before or after the saturation processing (the before is then the input luminance in the luminance mapper). Those two luminances are corresponding luminances of a pixel having its color optimized for obtaining an image of a high dynamic range scene, wherein the before and after luminances are luminances of two images of that scene of which the first image has a first image peak brightness (PB_HDR) which is at least a factor two higher or lower than a second image peak brightness of the other image (PB_LDR). The present concepts are especially useful in a scenario in which images of a different dynamic range have to be calculated. E.g., a 100 nit image is input (although this image together with the color processing functions F_Lt and F_sat contains all information for reconstructing a HDR image, or making MDR images, if done correctly), but what is ultimately needed is e.g. a 750 nit image, because a 750 nit PB_D display is connected. The apparatus is then required to make optimal use of all information, to make the luminances of all image objects look optimal on a display of this capability (taking into account of what the original master HDR image looked like, which is technically realized by employing the color mapping functions together with the input image pixel colors), but also the chromatic aspects of the pixel color, in particular its saturation. One of the two images of considerably different dynamic range (which is typically characterized by one of the two images having a different peak brightness PB_C or maximally representable luminance on its dynamic range, typically at least two times as large, or smaller, depending on in which direction, upgrading or downgrading, the dynamic range conversion goes), is typically an image which exists before the luminance mapping (of unit 401) and the other image is resulting from that mapping.

Advantageously the apparatus (400) has the first of the two luminances being a medium dynamic range luminance (Y'_M) of a pixel of a medium dynamic range image (Im3000nit), being an image with a peak brightness in between a peak brightness of a master HDR image, and a 100 nit peak brightness, which medium dynamic range luminance (Y'_M) is calculated from the input luminance by the luminance processor (401), and the second one of the two luminances is the corresponding luminance of that pixel of the master HDR image. This is a pragmatically useful embodiment, since the b-factors can then be calculated from the MDR luminances as index in the F_sat LUT.

Advantageously the apparatus (400) has as the first of the two luminances the input luminance. In this everything can be calculated from the starting situation, i.e. the input luminance forms the index into the LUT (which can be reset by the secondary luminance in embodiments which use an index correction, but this embodiment variant is useful for embodiments which correct the shape of the F_sat function, and keep the index as this input image luminance).

Advantageously is an apparatus (400) in which the first of the two luminances is a (e.g. medium dynamic range) luminance (Y'_M) calculated with a first luminance mapping function (1401) which optimizes for a first rendering capability of the darkest colors of the input image of a receiving side display, and the second of the two luminances is a (e.g. medium dynamic range) luminance (Y'_M) calculated with a second luminance mapping function (1402) which optimizes for a second rendering capability of the darkest colors of the input image of an actual receiving side display (201). The principle does not only work in case a new MDR image needs to be calculated for a different display peak brightness PB_D, but also for calculations of other dynamic range aspects, in particular which darkest black can be well-rendered by the receiving-side display.

Advantageously a high dynamic range image calculation apparatus, comprising an apparatus of one of the above described variants, is characterized in that the high dynamic range image calculation apparatus is arranged to output an image with a peak brightness of at least 500 nit.

Advantageously the invention may be realized as a method of processing a color saturation (C'bL, C'rL) of an input color (Y'L, C'bL, C'rL) of an input image (ImRLDR) to yield an output color (Y'M, Cb'M, Cr'M) of an output image (Im3000nit) corresponding to the input image, which output image is a re-grading of the input image characterized by the fact that its pixel colors have a different normalized luminance position (Y2) compared to the normalized luminance positions of the input colors (Y1), the normalized luminances being defined as the luminance of a pixel divided by the respective maximal codeable luminance of the image's luminance representation, whereby the ratio of the maximum codeable luminance of the input image and the maximum codeable luminance of the output image is at least 4 or larger, or $\frac{1}{4}^{th}$ or smaller, the method comprising:

receiving a luminance mapping function (F_L_s2h) defining a mapping between the luminance of the input color (Y'L) and a reference luminance (L'_HDR), and an initial saturation processing function (F_sat) defining saturation boost values (b) for different values of the luminance of the input color (Y'L);

calculating a display tuned luminance mapping function (F_L_da) based on the luminance mapping function (F_L_s2h) and at least one of a display peak brightness (PB_D) and a minimum discernable black (MB_D);

applying the display tuned luminance mapping function (F_L_da) to determine an output luminance (Y'M) from the input luminance (Y'L) of the input color; and mapping the input color saturation (C'bL, C'rL) to obtain the color saturation (Cb'M, Cr'M) of the output color on the basis of a saturation processing strategy which specifies saturation multipliers for the normalized luminance values (Y_norm);

characterized in that the method further comprises calculating a final saturation processing strategy (b; Bcorr) based on the initial saturation processing strategy (F_sat) and based on a secondary luminance value (Y'_H) which is derivable from the output luminance (Y'M) by applying a luminance mapping function (F_M2H) based on the luminance mapping function (F_L_s2h), and wherein the color saturation (Cb'M, Cr'M) of the output color is calculated by applying the final saturation processing strategy (b; Bcorr).

Advantageously a method is further characterized in that the one of the two luminances taken into account in the final saturation processing strategy calculation which is not the secondary luminance, is a lookup luminance to get a multiplicative factor (b).

Advantageously a method is further characterized in that one of the two luminances is a before-a-luminance-mapping (F_Lt)-luminance and the other one of the two luminances is an after-a-luminance-mapping-luminance, and that the two luminances are corresponding luminances of a pixel having its color optimized for obtaining an image of a high dynamic range scene, wherein the before—and after—luminances are luminances of two images of that scene of which the first image has a first image peak brightness (PB_HDR) which is at least a factor two higher or lower than a second image peak brightness of the other image (PB_LDR).

Advantageously a method is further realized in which the first of the two luminances is a medium dynamic range luminance (Y'_M) of a pixel of a medium dynamic range image (Im3000nit), being an image with a peak brightness in between a peak brightness (PB_HDR) of a master HDR image, and a 100 nit peak brightness, which medium dynamic range luminance (Y'_M) is calculated from the input luminance, and the second one of the two luminances is the corresponding luminance of that pixel of the master HDR image.

Advantageously a method is further realized in which the first of the two luminances is the input luminance.

So a basic property of our contribution to HDR technology is: MDR color calculation based on e.g. SDR input colors and a functional specification in metadata how such colors should be re-graded in general (in particular F_L=F_L_s2h specifies how the luminances must brighten when going from SDR image pixels to master HDR e.g. 4000 nit PB_C corresponding pixels, but this function also fixes how any in-between MDR image pixel luminance must re-grade, via the display tuning algorithm and corresponding function F_L_da; the chromatic part of the SDR-to-MDR or HDR-to-MDR color processing framework teaches with various possible embodiment examples how to use this luminance remapping needs information to correctly determine the corresponding e.g. SDR-to-MDR saturation boosts (b), which determines a final saturation strategy from the input reference saturation strategy as received, and uses in addition to two of the trios of luminances (SDRY, MDRY, HDRY), e.g. the input SDR luminance and the calculated corresponding MDR luminance, a third one of said trio e.g. a HDR luminance, to determine said correct final saturation strategy to be applied. This calculates a new saturation boost value for each possible input normalized luminance compared to the one as communicated in F_sat.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which the reader understands serve merely as non-limiting specific exemplary illustrations exemplifying the more general concepts which can be realized in other manners, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display). It should be clear to the skilled reader that—given the complexity of the matter and the various alternative realizations one could make—we have for conciseness of the teachings shown some components only in some images, but that those components can mutatis mutandis be added to the other various embodiments too. It should also be clear that some Figures describe aspects of the embodiments at any higher level of abstractness, e.g. at technical framework level.

In the drawings:

FIG. 1 schematically illustrates how classically the prior art teachings look at saturation processing;

FIG. 5 schematically shows how some embodiments of the total color conversion can first do a luminance transformation followed by a chromatic color transformation (in particular a transformation which adjusts the saturation of the pixels), or other embodiments can do the processing the other way around;

FIG. 6 schematically illustrates an embodiment communicating the HDR image actually as an SDR image, and typical color changes in a relative chrominance-based color space;

FIG. 14 schematically illustrates how there may also be luminance processing involved which correct for defects in black rendering such as e.g. significant leak light of the display leading to milky blacks, and how the two-luminance based optimized saturation correction strategy can also be tuned to work under such a situation;

DETAILED DESCRIPTION OF THE EMBODIMENTS

Figure 2:
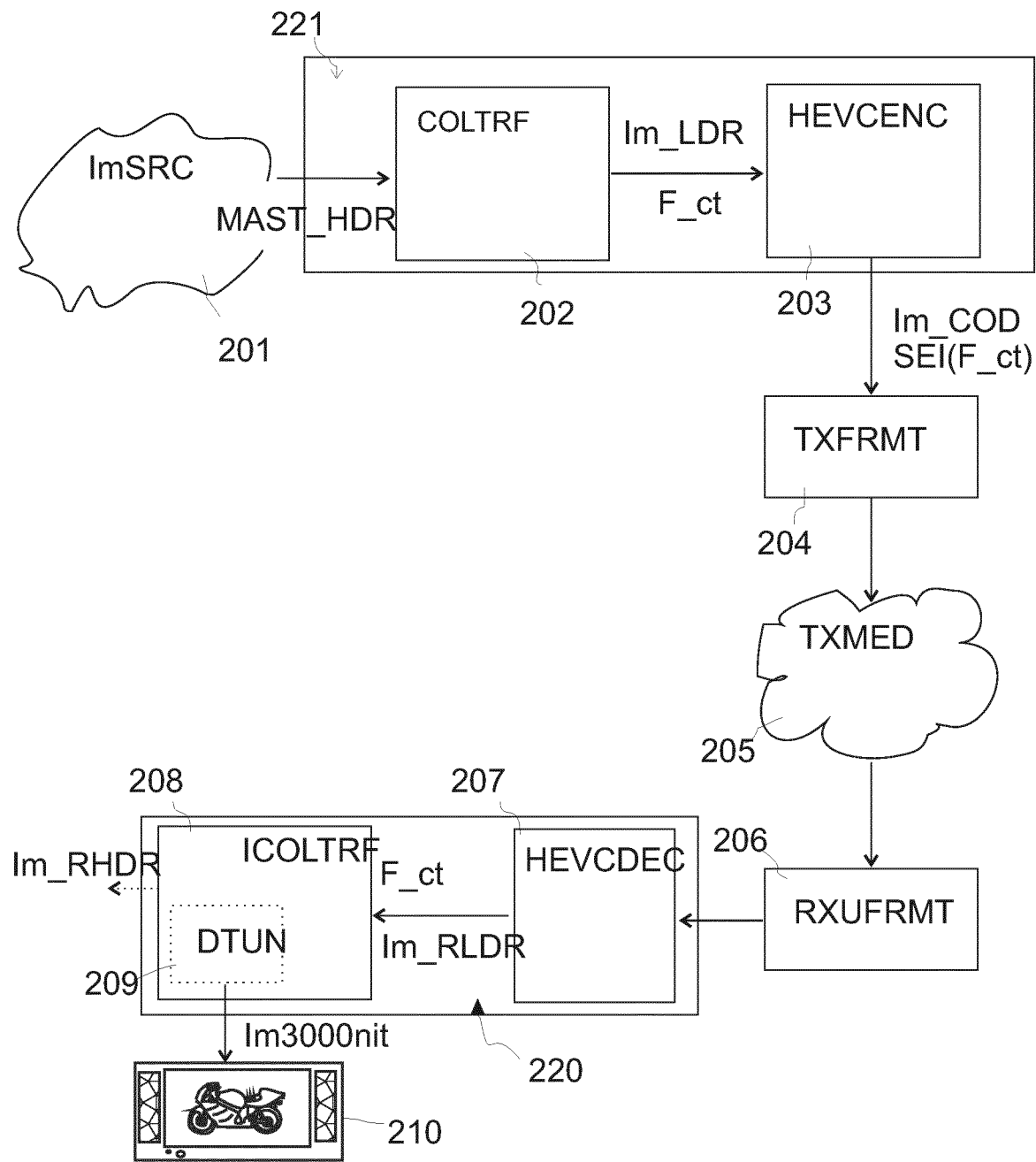
FIG. 2 schematically illustrates an example of a HDR image encoding framework with an encoder and decoder, in particular one which achieves the communication of high quality high peak brightness (e.g. 5000 nit) HDR images actually as SDR image, by also communicating on or more functions (F_ct) for mapping the pixel colors of the receiver-side received SDR image(s) to a sufficiently close reconstruction of the original master HDR image pixel colors.
Figure 3:
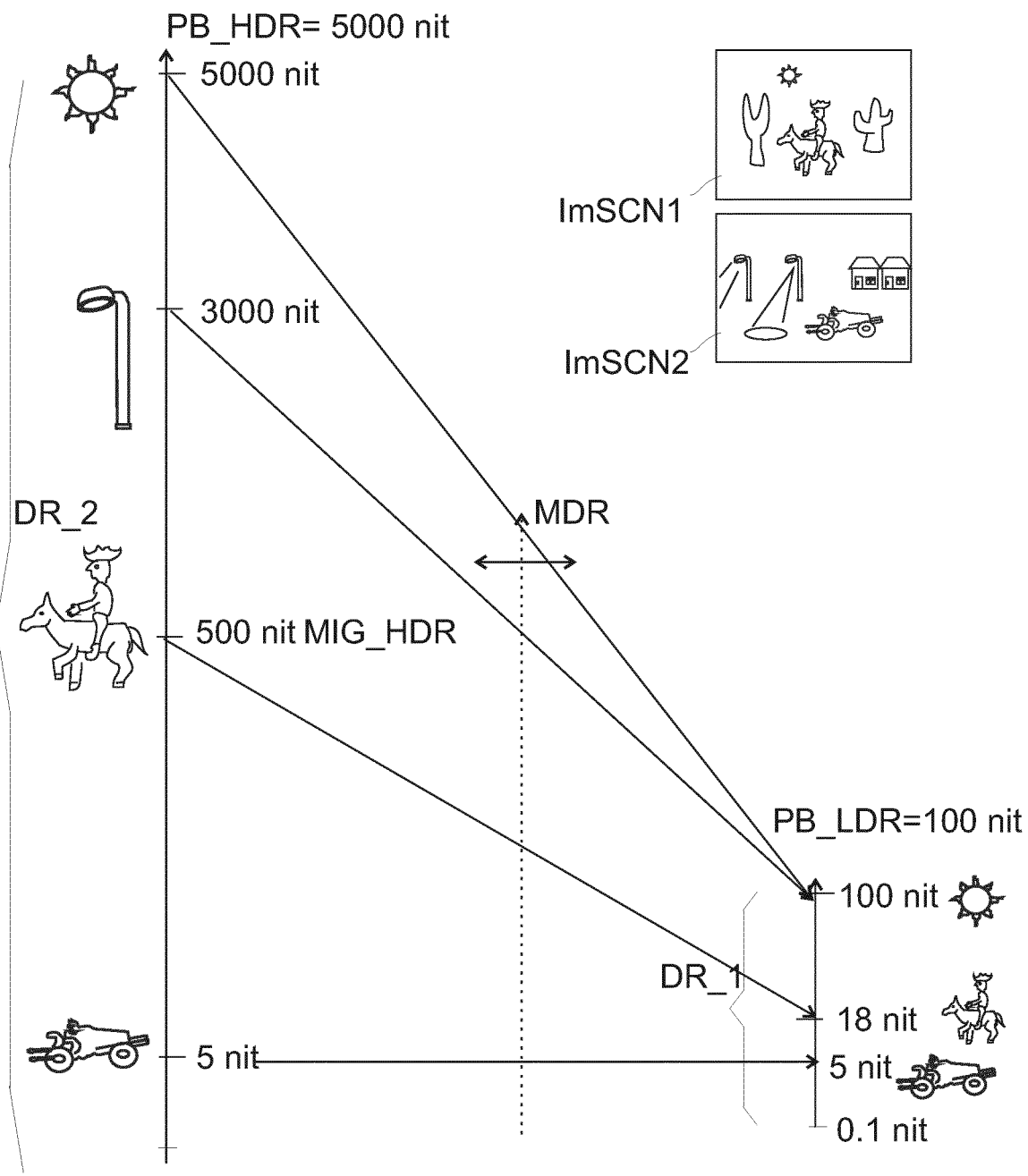
FIG. 3 schematically illustrates some of the color mappings that typically occur in image luminance dynamic range remapping (a.k.a. re-grading), at least as far as the luminance aspect of the pixel colors is concerned.

Before diving into various embodiment details (of the several possible ways to implement similarly the invented principles), FIG. 5 points the reader to the fact that—irrespective other details like e.g. which saturation definition and/or processing is used in a particular video communication system—some embodiments can do (e.g. at the decoding side; or in fact as we can describe it generically, in any apparatus that can do a two part brightness/chromatic processing) the luminance processing before the chromatic processing, or the other way around. Even some kind of parallel processing is envisageable. Even some "reverse order" processing is envisageable. E.g., say that the actual calculation engine for doing the pixel by pixel processing (i.e. the IC which processes the pixels sequentially on a scan-line covering the e.g. 4K pixels) is of the type chromatic processing first, and then luminance processing (i.e. first getting the correct saturation, and then the correct luminance). If one needs to know a boost factor s(Y_MDR) which corresponds to a particular luminance (or luma), but that luminance is not known yet (but e.g. only its SDR luminance, from the inputted SDR image), perhaps it is difficult to know a priori what to do exactly then as saturation processing. However, there are ways of doing that. E.g. a software parallel processing can in some cases in some manners establish what kind of saturation modification is needed for the present type of pixel. Because one only needs to test for the e.g. 1023 kinds of SDR luminances what should be done, so one could e.g. prior to the actual processing of the pixels of the current image send 1023 different SDR luminances through the color calculation chain (e.g. with the saturation block bypassed with a factor 1.0 for all Y values) and see which MDR luminances appear, which saturation is needed for those, and which equivalent saturation would be needed for the 1023 kinds of SDR pixels, in a pre-saturation topology. The skilled reader understands that other topologies are possible for the same result, e.g. doing the processing loop twice.

An interesting variant is where pixels may not have their final correct (e.g. HDR) luminances yet, but still there is some order allowing discrimination between pixels of various brightness, which allows chromatic pre-processing according to the correct type (brightness) of pixels. This can be done if a 1-to-1 link can be made between the pixel luminances in two different dynamic range representations, i.e. their (e.g. HDR) luminance position, and hence their particular needed saturation change. For substantially reversible systems, one would at least roughly have a relationship between SDR relative luminances and HDR relative luminances (linked by the luminance mapping), and MDR luminances (linked by the modified, receiver-side determined mapping), i.e. what would e.g. be needed as a saturation boost for MDR image pixels can in principle be formulated for corresponding e.g. SDR image pixels. This can be done e.g. if one has the input pixels normalized in some normalized gamut with some normalized RGB coordinates and luminance Y/Y_ref, even if Y_ref is not a fixed value for all pixels, but e.g. a monotonic function. As one can read below, one could then tune a saturation function shape to apply on chromaticities, or normalized chrominances (once everything is in the same gamut, one can do several things by dividing by the universal 0.0-1.0 normalized luminance range Y*).

FIG. 5A shows color processing, let's say of a decoder, of the luminances-first-type. An image of a first dynamic range (XDR) is input, i.e. the luminances Y_XDR of pixels. Without wanting to lose generality, one can imagine these to be SDR luminances or normalized luminances. Luminance transformation unit 501 applies some luminance transformation function F_Lt, say e.g. the exemplary gamma function. This results in luminances Y_ZDR for some image of another dynamic range (e.g. 100 nit SDR as input, and 1000 nit HDR as output). It is often useful to describe the transformations in a normalized gamut. In that situation, both the XDR image (the notation being a shorthand for an image with dynamic range X, e.g. 0-PB_C=X nit) and the ZDR image can have luminances in the same gamut shape (we have in FIG. 5B shown the transformation in the diamond representation corresponding to tilting the linear RGB color cube on its black point tip with the luminance axis going upwards; in case the primaries of input and output are different, the chromatic processing can also take that into account, but we will keep the explanation simple).

The difference between a HDR and SDR image will then be perceivable because for the same captured HDR scene, the SDR image will have a cloud of pixel colors spreading much higher up the diamond-shaped (normalized) encoding or display color gamut, and the HDR image will have a cloud with most (corresponding) colors falling much lower in that relative gamut (in the 100/1000 nit example typically approximately 10× lower), with only some colors high up in the gamut (e.g. the grader may have decided to map the brightest colors, e.g. some specular reflections of the sun on a metal surface, at PB_C, i.e. the top of the diamond, for both the SDR and the HDR graded image).

The saturation processing unit (502) then applies a saturation changing processing, of which without limitation we assume it to be of the type s_out=b(Y_ZDR)*s_in, in which s_out and s_in are saturations defined in some color space (e.g. Cr,Cb-based), and the boost function b(Y_ZDR) is some function prescribing the boost or diminuation of the saturation, as a set of values for the various possible luminances (and we will without limitation assume it to be a received LUT, with the Y_ZDR values as index, and the filled in values e.g. 1/k or k, e.g. 0.03, or 1.5, etc.). In this manner the saturation can be shaped not only based on the limitations of the display gamut, but also the needs for this particular image or shot of images, i.e. the actual distribution of its pixel luminances, which can fill the gamut in many non-uniform ways. The output colors ColHDR are in this example HDR colors, if the input is e.g. SDR. Note that in more complex embodiments the saturation boost function can be more complex and function of more image aspects, e.g. it may be defined as b'(max(R,G,B)-Y_ZDR), but we will again describe the more simple variant for easier understanding. Since this part performs a typical saturation by boosting the saturation measuring or equivalent coordinates, e.g. R-Y, G-Y and B-Y, the saturation boost function must be the ultimately "correct" saturation boost function b(Y_ZDR), i.e. since we teach a modification of an initial saturation strategy or function (which in some embodiments might at least be partially defined at the receiving side, but is oftentimes just the spec. of the optimal saturation processing between the two reference gradings of the creation side, as received in metadata associated with the HDR image coding signal), what we can call the final boost function must be used (the one corresponding to the specced one under the new situation, in particular a new calculation configuration topology).

FIG. 5B shows the operation of the two successive color transformations in a normalized (of the coding or a display corresponding with it) luminance chroma gamut 510, namely first transformation T1 doing e.g. a luminance increase, and then T2 doing e.g. a saturation decrease (which may be a typical color transformation for a decoder, or encoder, changing a higher dynamic range image into a lower dynamic range image, e.g. needing to do a saturation reduction for squeezing sunny outdoors pixels into the gamut; for a decoder doing a SDR to HDR color transformation, there may be first a normalized luminance decrease and then a saturation boost).

Similarly, FIG. 5C shows an alternative embodiment in which first a (pre)saturation processing is performed by saturation processing unit 521, and then a luminance transformation by luminance transformation unit 522, yielding again in this example HDR colors (ColHDR) as required. There can be reasons why somebody designs a preferred decoding topology like that. Note the through-linking of Y_XDR. FIG. 5D shows in normalized luminance/chroma gamut 530 how this processing order would first (transformation Ta1) do a (pre)saturation to correct saturation positions, and then the desired luminance transformation (Ta2, for which e.g. a decoder would get a luminance transformation function shape, as determined e.g. by a human or automatic grader at a creation side, and communicated as e.g. a LUT Y_out=F[Y_in]). We show now the typical processing for deriving a corresponding normalized HDR image luminance for an SDR luminance, i.e. the normalized HDR luminance (shown in the same gamut diamond) would be lower. The position of the saturation is already the correct one for that HDR luminance (despite the chrominance definition in this diamond gamut).

Actually, taking into account the usual teachings of decoding, the technical designer may be lured into thinking this involves what is schematically shown in FIG. 6. In FIG. 6 there is an exemplary HDR scene image (+co-communicated SDR grading) communication technology, of the type which communicates HDR images actually as SDR images, plus metadata of functions F_ct to calculate the HDR look image from the received SDR image(s), i.e. reconstruct HDR images RecHDR which are identical to the master HDR images at the creation side (HDR_in), except for perhaps some rounding errors due to quantization, DCT-ing, subsampling, etc. Luminance transformation unit 601 of encoder 600 will apply some specific luminance mapping function, e.g. LUT F_L[Y], as desired by e.g. the human grader for this movie (or well-working for a real-life television program). The output luminances in the resulting image (SDR), are SDR luminances (even if they are represented in the same normalized gamut, i.e. with Y_max=1.0). The chromaticities and in particular the saturation of those colors may not be correct, e.g. in some (intermediate) color representations these may be values which may be represented in the encoder, but not in a compliant YCbCr coding (or not with realizable RGB values, e.g. some pixels may have a negative R value, but this could still be done in some intermediate calculation embodiments). Saturation processing unit 602 is arranged to apply a saturation processing as desired (which may both artistically make nicer colors, and/or bring some of the colors within the RGB gamut), by a selected saturation modification function b(Y_SDR), which codifies a saturation multiplier for each possible normalized SDR luminance Y_SDR. This yield the final, fully correct SDR colors (ColSDR), which are ready for video compression, and transmission over some transmission technology 610, e.g. a video communication cable, or an internet connection, or a proprietary video network for showing e.g. pre-stored commercials in a supermarket, etc. Together with the images Im having for the pixels the SDR colors (e.g. typically in a YCbCr representation, although equivalent representations like direct RGB coding would equally be possible, as long as one codifies those calculated SDR colors; say as a 10 bit HEVC compressed image), the inverse of the two color processing functions are encoded as metadata, INVF_L and INVb, for direct use by a decoder 605.

The saturation processor 603 of the decoder, applies this inverse saturation function INVb on the SDR luminances (Y_SDR) of the received SDR image (Im), yielding an already correctly pre-saturated SDR image (RSDR), for later becoming a HDR image (the saturations of the pixels may look non-optimal if this was to be used as an SDR image for rendering on an SDR TV or display, as it is an intermediate image). Subsequently, luminance transformer 604 converts the SDR luminances to the corresponding HDR luminances with inverse luminance mapping function INVF_L, thereby creating the RecHDR image.

The operation is shown in the diamond gamut of FIG. 6B. The thin lines show the operation of the encoder, making the SDR equivalent grading of the HDR master image, and the thick lines show how the decoder almost perfectly reverses this color operation, with the inverse functions, yielding substantially the original HDR image colors of the creation side, in the receiver's RecHDR image. All this can be shown in a single gamut of whatever dynamic range Y_XDR, because the various dynamic range colors can be shown in a normalized gamut as shifted corresponding color positions.

So this seems a perfect system to handle HDR images, and it is, and this was also how it was designed initially by applicant and used internally and externally on many kinds of HDR content. However, this obfuscates a problem. This is a perfect way of HDR handling, if only a pair (only 2) of gradings is involved, e.g. for a HDR rendering system which need only reconstruct the original e.g. 5000 nit master HDR images, from received SDR images. But one will discover a problem, after considerable testing, because it may not show itself immediately, if one adds as mentioned above the following desideratum, namely that some viewer will watch their received 5000 nit movie not on a 5000 nit HDR TV, but e.g. on a 2500 nit outdoors publicity panel (an MDR display). As said, this system (e.g. this outdoors panel) needs to do at least some luminance allocation to obtain the luminances to be rendered on this panel. This had better not be a clipping of all luminances above 2500 nit, because then e.g. all clouds in a bright sky may be lost. A mere linear luminance compression bringing 5000 nit coding white to the 2500 nit display peak brightness may also not be the best option, so one must apply some smarter optimization. In general there will be some luminance transformation, which shows itself as a shift of the colors (even if they were to come in as HDR colors instead of SDR colors, i.e. a downgrading to SDR at the receiving side), which can be shown in a gamut graph like FIG. 5B or FIG. 6B.

Figure 7:
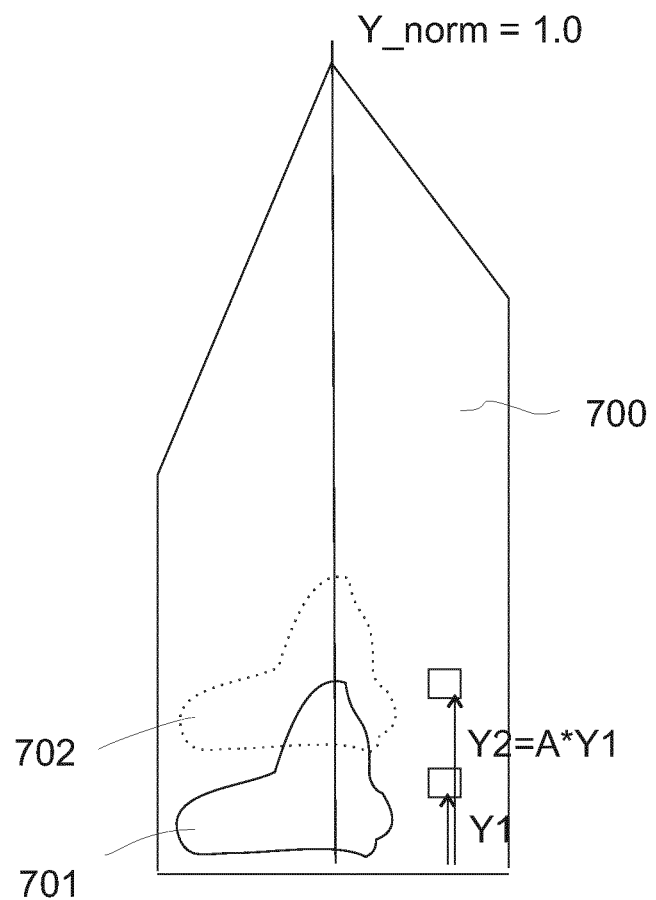
FIG. 7 shows a color mapping in a chromaticity-based color space, and what a change of normalized luminances for optimizing an image for a display of a different dynamic range including a different peak brightness may typically involve.

Before diving into this, it may be good to look at the gamut in a slightly different way, namely a chromaticity-based gamut (with cylindrical walls going up from black), because that clarifies the difference between the lower part of the diamond, and the upper part. Although the diamond gamut shape is the one of typical technical image and video color representation, the chromaticity-based color space is a more natural manner to indicate what colors should ideally be, and become when processed. Although the chromas of color may increase with increasing luminances (e.g. for a primary red following the lower extremities of the diamond gamut), the saturation of the colors in the lower part may stay the same with increasing luminance (which corresponds to the natural principle of illuminating a scene object with a certain intrinsic (ergo fixed) saturation with more light). This is shown in FIG. 7. Such a luminance/chromaticity gamut (which changes the upwards conical, from the black point outwards moving gamut boundaries in the lower part of the gamut into cylindrical walls, which one may equate with maximum saturation s=1.0, for this coding or display) is useful for showing the real problem, namely, where the upper part of the gamut, near white, can only accommodate limited saturation colors, or in other words pastel colors. Nonetheless, several HDR scenes may contain makeable colors for both the higher dynamic range gamut, and the lower one (even when going so low as SDR), which is part of the reason why a problem with the saturation of the pixels may go unnoticed for some time. The actual image color cloud is shown for a HDR master image (HDR colors cloud 701), and for a lower dynamic range corresponding image (MDR colors cloud 702), which, if one desires the same finally rendered luminances on both displays, corresponds to higher normalized luminances (Y_norm), yet the same chromaticities and saturations, ideally (i.e. the position of the color points away from the achromatic axis in the middle of the gamut). The most critical problems would occur in the tip of the gamut, where it becomes thin, and can only contain whites and near-whites (that need not necessarily be a problem for several HDR images, as this may be the position where lights and specular reflections reside, which are whitish in general). But also for the darker colors, the fact that theoretically some solution can exist with the appropriate chromaticities for both the SDR, MDR and HDR image pixels, doesn't mean that also in practice the calculations would immediately be correct for all handling systems. The colors could still be wrong, even if only somewhat wrong in the MDR image.

Figure 16:
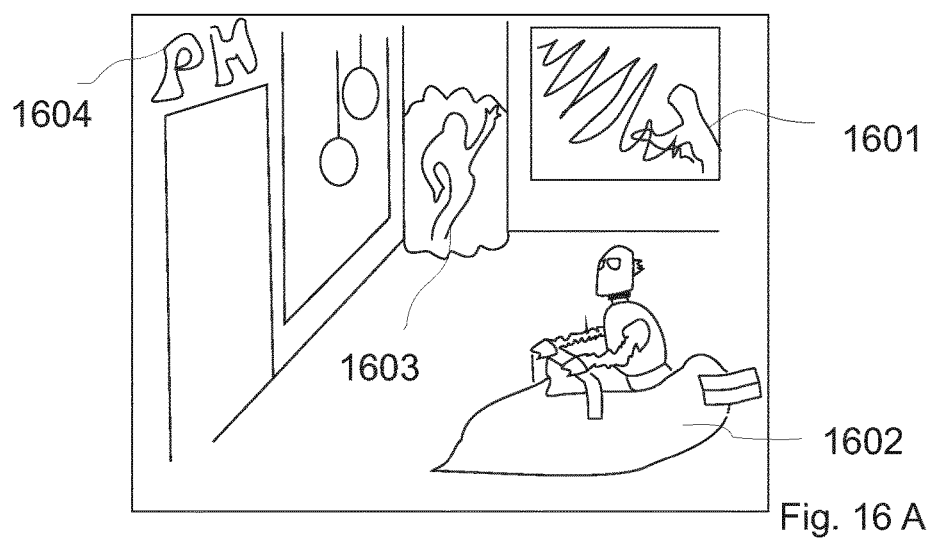
FIG. 16 schematically elucidates how display tuning works, and how a display tuned function F_L_da can be calculated from the template F_L_s2h luminance mapping function as received, which communicates the re-grading needs for this HDR image as determined by the content creator when re-grading between the two extreme ends of the range of re-gradable functions, namely the reference gradings being typically the master HDR image as originally created and its corresponding SDR 100 nit PB_C image.
Figure 16:
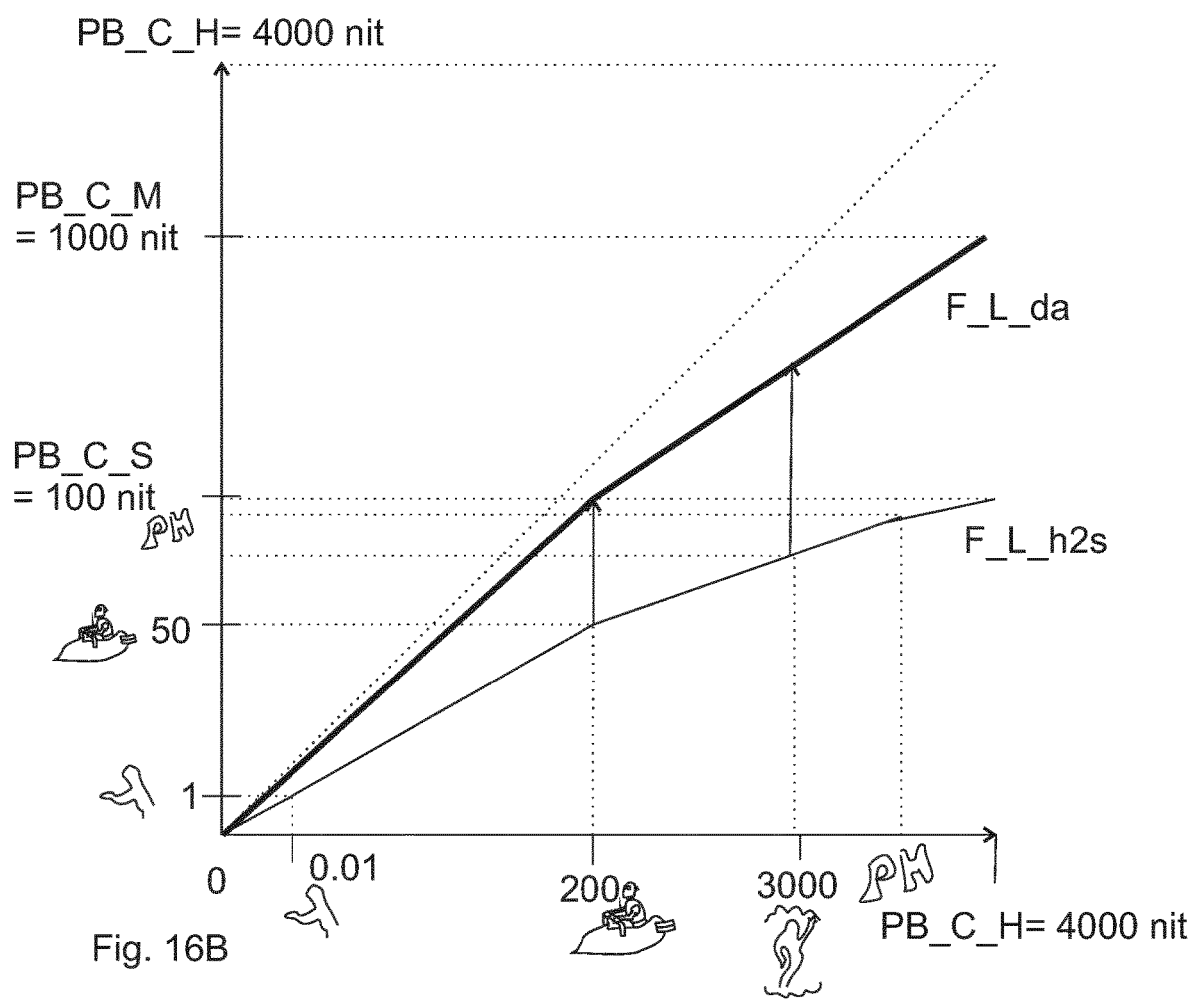

Another important background concept must be explained with FIG. 7, for the reader to better understand the later teachings. As said, the luminance mapping between say an MDR luminance Y2 and a HDR luminance, can be any complex function, e.g. $Y2=a*Y1^3+b*Y1+c$. However, whatever the mapping from Y1 to Y2 (or vice versa) is, one could conceptually see it as a multiplicative scaling with some value A. A will of course not be a constant, but will be variable for all possible Y1 values, with A-values depending on the actual shape of the selected luminance mapping function, i.e. A(Y1). Also, if the mapping from SDR to HDR corresponds (for some value of Y1, e.g. 0.05) to e.g. A=0.1, then it is logical that the mapping to any in-between MDR luminance, will have (i.e. for HDR to MDR_500 mapping e.g.) some less strong multiplier i.e. for smaller than 1 multipliers a higher-valued multiplier, e.g. A'=0.4. It should be noted that for various reasons, regarding the optimal correlation between display capabilities and current image content needs, these in-between boosts or dimmings could be quite complex, with various possible tuning scenarios, but the generic point for this patent application is that, for a given tuning situation such as a MDR peak brightness, one could always specify a set of scaling factors A', for all the possible starting luminances, whether SDR or HDR luminances, to calculate e.g. Y_MDR=A'*Y1. There is no difficulty for the skilled person to understand and implement this from our teachings: once he has a re-grading function between the HDR and MDR luminances, e.g. as created as giving good visual results by a human grader at the creation side and communicated as a SEI message, he can calculate this into a set of multipliers A(Y_HDR) and implement this in his luminance processing IC part e.g. as a LUT. There is also no particular problem regarding the display tuning of the luminance mapping function. As far as the generic principles of the present invention are concerned, the reader may assume that (following FIG. 16) the function goes through the halfway points between the y-coordinates for any Y_HDR x-coordinate position of the HDR-to-SDR reference luminance mapping curve F_L_h2s and the diagonal in case the PB_D lies halfway between 100 nit and PB_C of the master HDR grading, and similarly for other PB_D situations, e.g. 90% of PB_C=4000 nit, and for more advanced possibilities of display tuning he can if he wishes consult e.g. our WO2017108906. And in case he wants to use his own display tuning principles, he should have the knowledge to turn his data into a final F_L_HDR-to-MDR or F_L_SDR-to-MDR to use in our framework. Ergo, one could say that the luminance mapping LUT can also be specified as a LUT containing such multipliers, which will shift the cloud of image colors upwards or downwards, but typically in a non-uniform manner (with e.g. the tip of the cloud in FIG. 7 considerably squeezing vertically, but the bottom lobe staying e.g. the same size and shape, which would be the generic situation of the simplistic example we have drawn for elucidation, which for simplicity is merely a translation of the cloud shape).

Just one example will give an idea of how such a multiplicative view on luminance mapping is a way to more easily understand possible tuning algorithms, for deriving an MDR luminance from an SDR or HDR luminance. Suppose the lower HDR color is at a vertical height Y=0.1 (or 1 in units of $\frac{1}{10}^{th}$). Say the SDR luminance Y2 is at 0.5, ergo, the SDR luminance can be calculated from the HDR one by multiplying with A=5 (or similarly, the HDR luminance can be reconstructed by dividing the received SDR luminance by 5, as explained with FIG. 6). The MDR luminance will be at some intermediate position. For the simplest tuning embodiment (assuming one will have two different displays but in a similar, say typical evening viewing television environment, ergo, for elucidation ignoring all tuning expertise one may need for handling also surround illumination and viewer adaptation), the in-between position will depend on the peak brightness of the MDR display (PB_D_MDR), i.e. where it falls on a scale of possible display peak brightnesses between 100 nit being the minimum and PB_C_HDR being the peak brightness of the reconstructable HDR image of the received image(s) on the other end.

If the HDR-to-SDR multiplication dims the SDR normalized luminances by say 5, one could use e.g. some power function to derive an A' for the HDR-to-MDR calculation, i.e.:

A'=power(A, F(PB_D_MDR)), with F some (typically pre-fixed in the system, but in some embodiments choices from the creation side could also be communicated in metadata) function of PB_D_MDR, conditioned to give a unity transform if a display with the HDR PB_D=PB_C_HDR is to be supplied with a tuned MDR image (which should then be the master HDR image), and the HDR-to-SDR transformation as determined by the grader, in case an MDR display is connected which happens to be an SDR display, i.e. with PB_D=100 nit. The exact function shape can be used to design how fast MDR displays should start behaving as HDR displays versus giving a more SDR-ish image look, as one moves to ever higher PB_MDR values.

E.g., a well-working embodiment which we will use to elucidate the following without desiring to thereby limit the generality of our embodiments, is:

A'=A^ap, in which ap=log(PB_MDR/PB_HDR)/log (PB_SDR/PB_HDR), in case the MDR is calculated from HDR (PB_HDR being the whatever PB_C of this image coding; PB_SDR as typical 100 nit). The mutatis mutandis similar situation when calculating the MDR image from SDR would be ap=log(PB_MDR/PB_SDR)/log(PB_HDR/ PB_SDR), to be applied to the e.g. A=⅕ HDR-from_SDR relationship example above. E.g. ap could be log(5)/log(10) =0.7, giving a dimming of only 0.32 instead of 0.2 to derive MDR from received SDR. Of course several more complex variations can be envisaged and have been developed by applicant, which work similarly, but in any case they can all be formulated to give some A' for the A values, of the Y-values, i.e. thereby realizing the various re-gradings of the tuned situation, for whatever possible relationship between the HDR and SDR grading of some HDR scene (i.e. the A[Y_SDR] values).

So this would enable having a display tuned output, i.e. the luminance transformer 604 will apply the A'-LUT luminance transformation function instead of the A-LUT, to obtain the MDR image (instead of the reconstructed HDR image), when it gets SDR input.

However, the problem is: what of the saturation, is that now still applicable? A processing may have been done by the saturation processor 603, where it was expecting that one would calculate the HDR luminances for the pixels, rather than the very different MDR luminances.

Figure 8:
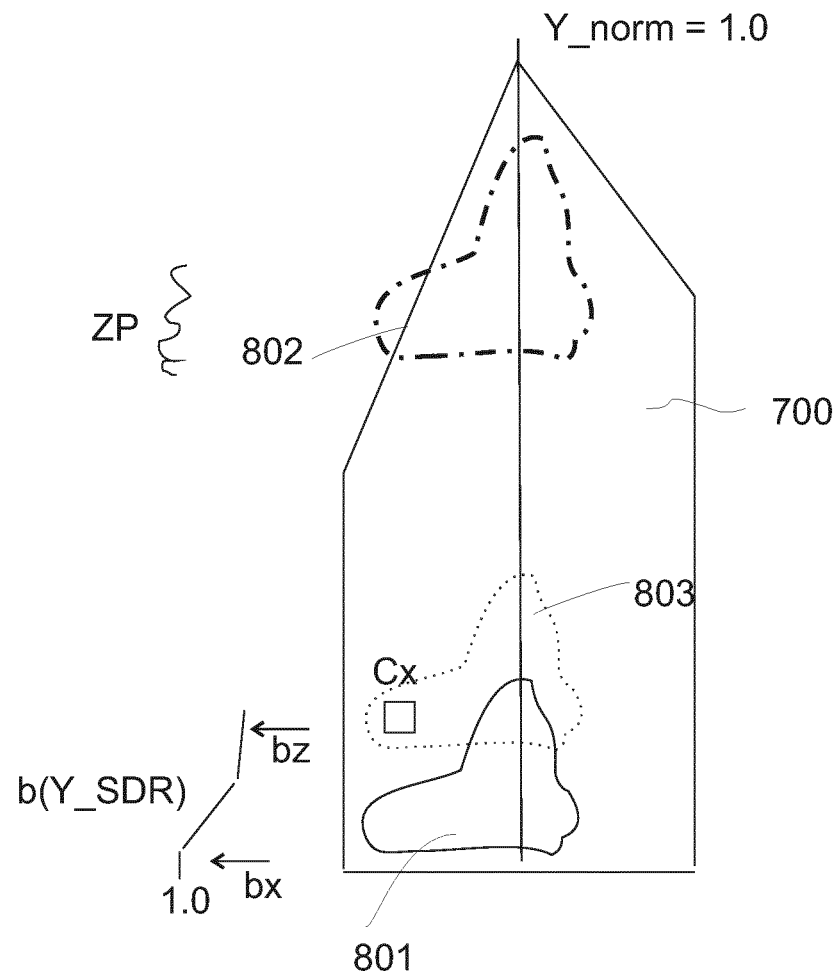
FIG. 8 inter alia shows how colors which would be needed to have a corresponding look on the display of different dynamic range may fall outside of the realizable color gamut, and that this must be handled, by an optimal saturation correction strategy.

E.g. in a YCbCr color encoding (and saturation processing strategy), the Cb and Cr are defined by the luminances, because they are defined as a difference of non-linear RGB coordinates which grows with luminance. But even in the chromaticity-based view we can see a problem, which is more clearly illustrated with FIG. 8. Even if the saturation processing is the second processing step, receiving a sat [Y_SDR] LUT prescription containing various boost/dim factors cannot be trivially applied in this second processing block. We explain with FIG. 8 the other typical scenario, in case the receiver gets a communicated HDR image as input (e.g. with 10 bit SMPTE ST.2084-defined lumas), and it uses the functions (F_Lt, F_sat) for calculating an optimally looking SDR image, for those viewers having a 100 nit TV. We see (already at the content creation side) that if we weren't to apply a desaturation, a mere shifting of the HDR luminances (the image colors falling in blob 801) to higher (normalized!) SDR luminances (in blob 802), would create a problem of calculating colors which fall out of gamut for this content (in problem zone ZP). As an example one can take the neon sign of FIG. 16, for which it is not that critical if a saturated bright blue (or red) lamp gets represented in SDR as a somewhat desaturated blue (because the viewer after decades of watching SDR images kind of expects such a behavior for a lamp, actually, this is an indication that the object is probably a lamp, even if SDR cannot really encode or display luminous objects; and even for reversable SDR-based coding systems, provided one selects a savvy desaturation strategy, the original HDR neon lamp colors can be reconstructed quite reasonably). That out of gamut problem can be cured (fully or at least partially, as technical or market requirements may desire) by applying a multiplicative saturation boost (actually in this case a diminishing), with a (SDR) luminance-dependent function b(Y_SDR). The reader should also understand that any actual scene image may oftentimes only contain one such critical object (maybe only one neon sign and all the other pixels being relatively "easy" to re-grade), which is what can relax the technique compared to a case where all gamut issues have to be handled at the same time (for such a highly infrequent image one may in practice decide to go for an amount of color error anyway). We see that below and for the lowest part of this HDR scene's image blob (which just has highly desaturated dark colors), one can use b=1.0. For the part where the saturation is high, i.e. the blob part protruding to the left, we need to apply a diminishing boost, e.g. linearly going down from 1.0 to 0.3, so that then the colors of the SDR blob 802 will fit well in the tip of the gamut.

If however, we want to apply a (post)saturation on colors which are already on the MDR relative luminance range (i.e. MDR luminances having been calculated, which will fall in the 803 blob, not the 801 blob anymore), because the luminance mapping function has been applied already, we should not for the color Cx apply a saturation boost for that relative luminance height, because then it will be too small, leading to too much desaturation. What we should apply in this example is a factor 1.0. We know that this MDR blob plays a role of output image, i.e. similar to an SDR image being calculated from the HDR input image. We know also that for this example decoder, the encoder had generated a luminance mapping function F_L for mapping HDR luminances to SDR luminances (now used display tuned for mapping to MDR luminances) and a saturation boost function for desaturating HDR chrominances to SDR chrominances (now to be transformed into a different saturation function). And in this example, the b function would be defined over the range of normalized output luminance positions of the encoder's luminance mapping, i.e. normalized SDR luminances. Ergo, we can treat the blob 803 as if it was a SDR blob, and can find its corresponding lower than blob 801 HDR blob luminances. Because the mapping between those two—i.e. the MDR blob and deeper HDR blob—will both be inside the cylindrical part of the gamut, it is guaranteed that the b-function value (for that bx position) will be 1.0.

Figure 17:
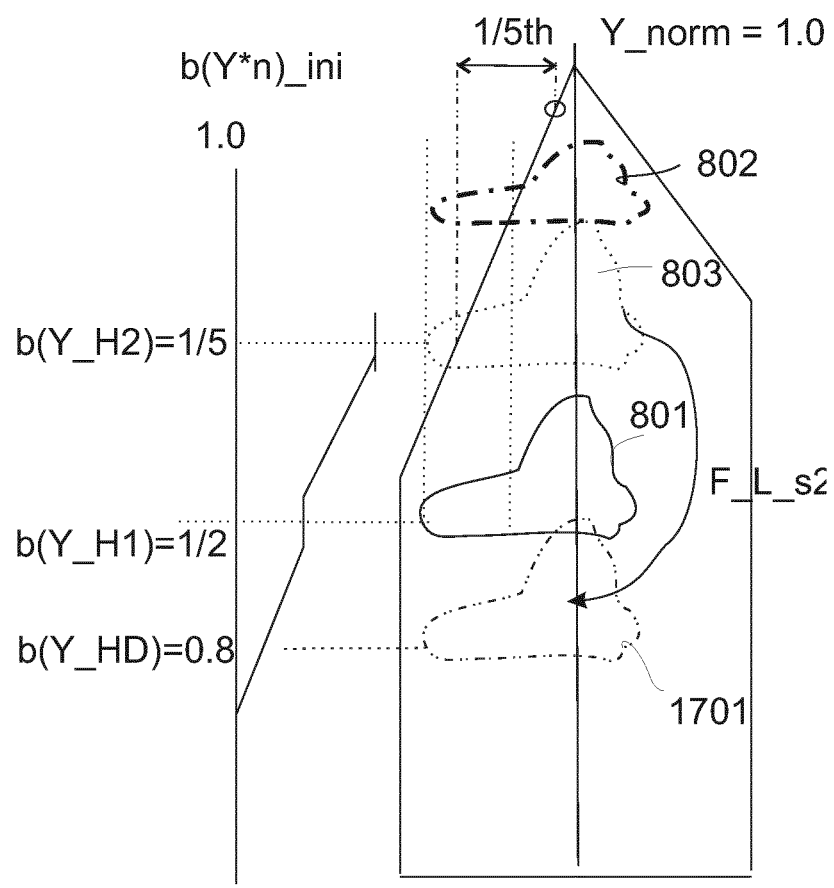
FIG. 17 schematically shows another embodiment of how a HDR secondary luminance can result in a good saturation processing strategy to turn input SDR chrominances into good corresponding output MDR chrominances.

To make sure the reader is not mistaken, we have added another example in FIG. 17. In this case the colors of the blob 801 (we assume still we start in the HDR image communication mode, so the process is the same at encoder and decoder) are now so bright that the reside at least partially in the tent top of the gamut. This has as effect not only that the saturation of the SDR blob which gets squeezed by the reference luminance mapping F_Ls2h is smaller. Also the MDR blob 803 colors, which are calculable from the received HDR blob by some display tuned luminance mapping function F_L_da (which can have other shapes than the example, but would always implement the squeezing into the gamut top luminance-wise) will obviously need to be desaturated now, because as shown with the dotted blob 803, keeping the same saturation will to some extent lead to an out of gamut problem (although with a forward display tuning processing which need no further calculations requiring reversability it is no fundamental problem if some colors do get gamut clipped, but it is preferably not so if avoidable). So to calculate the required desaturation to transform the input HDR blob of colors 801 into a well-fitting blob 803, we can determine another (fourth) luminance Y_HD (which is a HDR luminance) by applying the communicated (i.e. not display adapted) reference luminance mapping F_L_s2h to any luminance Y_MDR in the MDR blob 803 to obtain a corresponding Y_HD in the associated HDR blob 1701. This position yields a desaturation value of 0.8 on our function of boost values as initially communicated B(Y*n)_ini, i.e. supposed to desaturate HDR colors to SDR colors not MDR colors, and this works surprisingly well for the amount of desaturation needed to obtain the MDR blob 803 from the input HDR blob 801 (after having done the relative luminance positioning in the previous luminance mapping subblock). Maybe not so surprisingly when one gets the aha insight that one could conceptually re-interpret the MDR block (although mind you that for the skilled person these are entirely different colors!) as if it were a block of SDR colors that happened to be there. For that situation, the creator of the F_L_s2h would have guaranteed that such colors with such luminances and critically high saturations, would have mapped nicely to its corresponding "SDR" position which is actually the MDR blob 803 position (so after this insight one can forget about blobs 801 and 802 then, at least for this saturation processing).

Whilst this may be the theoretical optimum, one can also make other pragmatically still useful embodiments deriving some secondary HDR luminance in addition to the MDR luminance. If one uses the original HDR luminance Y_H1 for this object's pixel as it was in the master HDR image (and in this example as it was received, but in the example of SDR image communication as it is calculable from the SDR pixel in SDR blob 802 by once again applying F_L_s2h, but then to blob 802 instead of to blob 803), one would get a value of ½. This may generate a somewhat too desaturated MDR blob, however, it is still a well usable color since on the one hand no out of gamut saturation occurs (and one would not expect this to happen, because since the function B(Y*n)_ini needs to be typically decreasing to fit colors into the tighter higher areas of the gamut tip, if the lower HDR position Y_HD works nicely it may be expectable that the b(Y_H1) value should also work not too badly, especially for most of the typically occurring HDR colors, since the brightest ones are typically less critical lamp or specular highlight pixels anyway), and on the other hand it would be far better than using the extreme value ⅕ that one would read on the Y_MDR input location (the input location into the saturation boost value function that one would normally use, as it comes out of the first luminance processing part, if one hadn't learned about our present teachings).

So the skilled person has learned he can calculate according to his preference one of two possible secondary luminance values from the Y_MDR (or via the mathematical relationship of the trio similarly from the SDR luminance): either the original Y_H1 via the inverse display tuned luminance mapping function F_L_da, or the preferred Y_HD via the F_L_s2h, under the same philosophy that using (as a new saturation strategy) this secondary luminance as an input (lookup) value instead of the primary Y_MDR value, a much better desaturation function for obtaining the MDR colors is achieved.

The same aspects will apply also when not calculating a resultant image of the pair of extreme-end (i.e. reference) dynamic range gradings from a different intermediate image, but to an image which is not the one expected from mere reconstruction (i.e. the other of the co-communicated two gradings, e.g. HDR predicted from received SDR, or vice versa), but rather some MDR image, with a PB_D only known at the receiving side.

Figure 4:
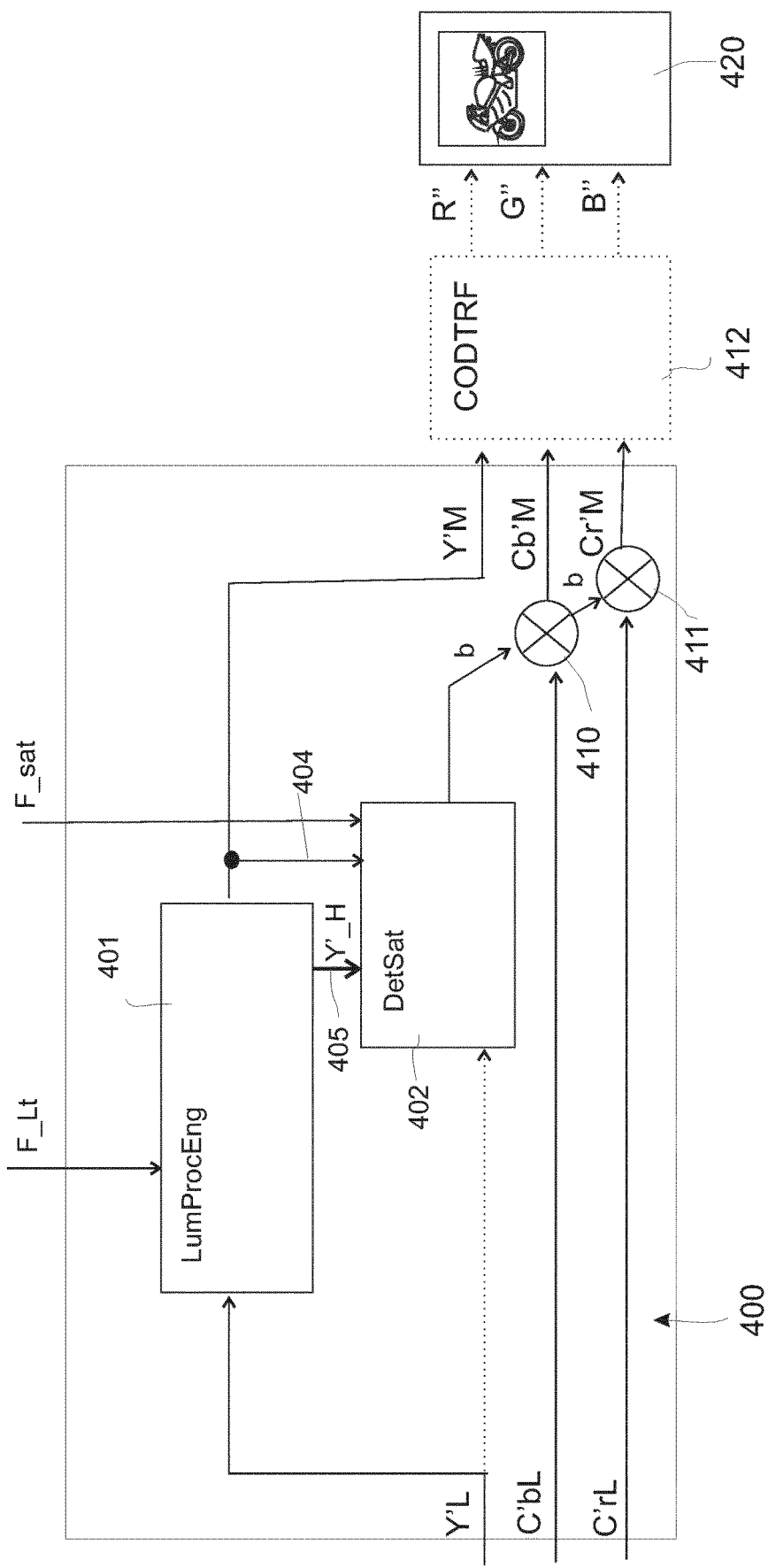
FIG. 4 schematically shows an embodiment of a new HDR image decoder, following some of the principles of the present application.

FIG. 4 gives an example of a standardized dynamic range processing apparatus 400 of applicant.

The input in this decoder is SDR YCbCr encoded (after MPEG decompression e.g.), namely a luminance Y'L (actually a luma, but that is equivalent to a luminance; we assume normalization to 1.0 happens in the luminance processor 401). This seems to be a parallel processing of the luminance and the chromaticity, but actually it is a chromaticity/saturation processing which follows the luminance processing, because of the input of the medium dynamic range luminance Y'M (as can be seen if the corrective action to obtain the correct final b(Y*n) values weren't determined in 402 via the secondary HDR luminance Y'H, then the wrong b function would be used by the actual re-saturation processing part here embodied as multipliers 410 and 411). F_sat is without loss of generality of other embodiments like a parametric functional specification supposed to be a LUT containing boost factors b[Yx], with Yx being a normalized luminance (and note that although initially one would think Yx is associated with in the example the HDR colors, because it is applied after the luminance processing of 401 which converts in this elucidation example the SDR input luma Y'L into a HDR luma in case it runs in the normal reference SDR-to-HDR situation by loading as F_Lt the F_L_s2h function and not the F_L_da function in the LUT of 401, in fact one can see it as general/unique normalized colors which is why we also introduced the notation Y*n, but needless to say by using our principles taught in this patent application, i.e. all possible luminances between 0 and 1.0, typically in some subsampled precision. But to be clear, the b[Yx] inputted LUT would be the one to derive HDR from input SDR colors, and not MDR colors, because the correct MDR LUT or chromatic processing strategy in general still has to be derived by unit 402 (the multipliers don't care what happened, they just need to be fed the correct, i.e. at least giving reasonable images, b value for each Y'L of a consecutively inputted pixel).

Now, if the luminance processor outputted the HDR reconstructed luminances (i.e. Y'M=Y'_H), the saturation would be straightforward to realize (as it then would happen in the reconstructed HDR color representation, which was also used at the encoder side to determine the saturation LUT of the optimal HDR-2-SDR conversion):

(R'out−Y'_H)=b(Y_H)*(R'in −Y'_H), and similarly for G', and B', or, since:

$$Cb=(128+)a*(B'-Y\_H)$$

Cr=(128+) b*(R'−Y'_H), with a and b constants depending on the colorimetry of the encoding system (and the constant 128 is for the exemplary embodiment with a 8 bit representations, with similar constants being used for e.g. 10 or 12 bit), i.e. the e.g. Rec. 709 primaries, one can also write the saturation as a multiplication of Cb and Cr with the appropriate b(Y_H), performed by multipliers 410 and 411. Together with Y'M being Y'H, the output chrominances Cb'M and C'rM would, for a mere HDR reconstruction, give the correct HDR image pixel colors.

However, for MDR image calculation, input 404 in the saturation factor determination unit 402 would not give the appropriate scaling factors.

A secondary information is needed to be able to determine the correct saturation multiplication factor for the MDR color calculation. In this embodiment this would be the HDR luminance Y'_H, on input 405 (which is not at all needed for the luminance processing part, but it is needed for the chromatic calculation part).

Ergo, this is a first elucidating example of what we need in general (in-line with what we explained on the color gamut in FIG. 8, which already forms an algorithmic sufficient specification of a typical embodiment of our invention, but here we describe it in a typical IC calculation unit topology): whereas a normal saturation calculation, if not already with a constant factor b for all Y*n (which is the usual way to calculate different saturation video colors), would at best have a dependency on a single luminance, namely the luminance of the color being processed, the applicable (final) saturation now is determined based on two luminances (more example embodiments follow below), even if the final saturation is still applied on a single duo of chrominances by the multipliers 410 and 411.

Mathematically this can be written as:

(R'out−Y'_H)=b(Y'M, Y'_H)*(R'in −Y'_H), etc., or similar formulation in other color representations, or other saturation processing determinations (we have dropped the factor F_sat, which is a communication of a desired saturation behavior/profile from the creation side, because the principle can also be applied e.g. to color calculation embodiments of an apparatus calculating an image of different luminance dynamic range wherein the receiving side determines its own strategy for the chromatic or specifically saturation processing, but, again based on two luminance values for the pixel being processed. Or in other words the saturation factor determination unit 402 would determine b*_out(Y*n)=G(b_in(Yx), Y'_H), whereby the Y'_H is calculable from the Yx=Y_MDR, and the G function obtains the corresponding needed saturation on the blob as explained, but now when starting from Yx=Y_MDR rather than Yx=Y_HDR. As will be apparent below, there are two equivalent manners to realize the same in practice: either one calculates a new x-position to lookup the b(Yx) starting from the Y_MDR position, or one equivalently calculates the corresponding re-calculated b*(Yx) function shape so that one can directly read the correct b-value for the multipliers but then at the initial Y_MDR position calculated by luminance processor 401 (which the skilled person understands still needs the knowledge of that same Y'H value). Without needing to dive into complex colorimetric detail, some variants like the V-Y based variant below may prefer one option over the other for pragmatic realization.

What is further shown is an optional (not the core part of this application but just for completeness) color convertor 412 to determine a display-desired color representation, e.g. R'', G'' and B'' specified according to some non-linear OETF suitable of communicating HDR signals into a display 420 (various manners can exist, but those details are not relevant to further dive into here). Note the dashed input connection (arrow) from the input luminance Y'L into unit 402, indicating that the final saturation (b) to be applied can be determined both from the e.g. SDR input luminance as a normalized index into the boost values LUT, or from the already calculated MDR luminances (Y'MDR), as this will only involve a different calculation of the final saturation boost function, according to the same overlying technical principles (and according to which technical choice was made, for the color processing part of the decoder e.g.).

Figure 9:
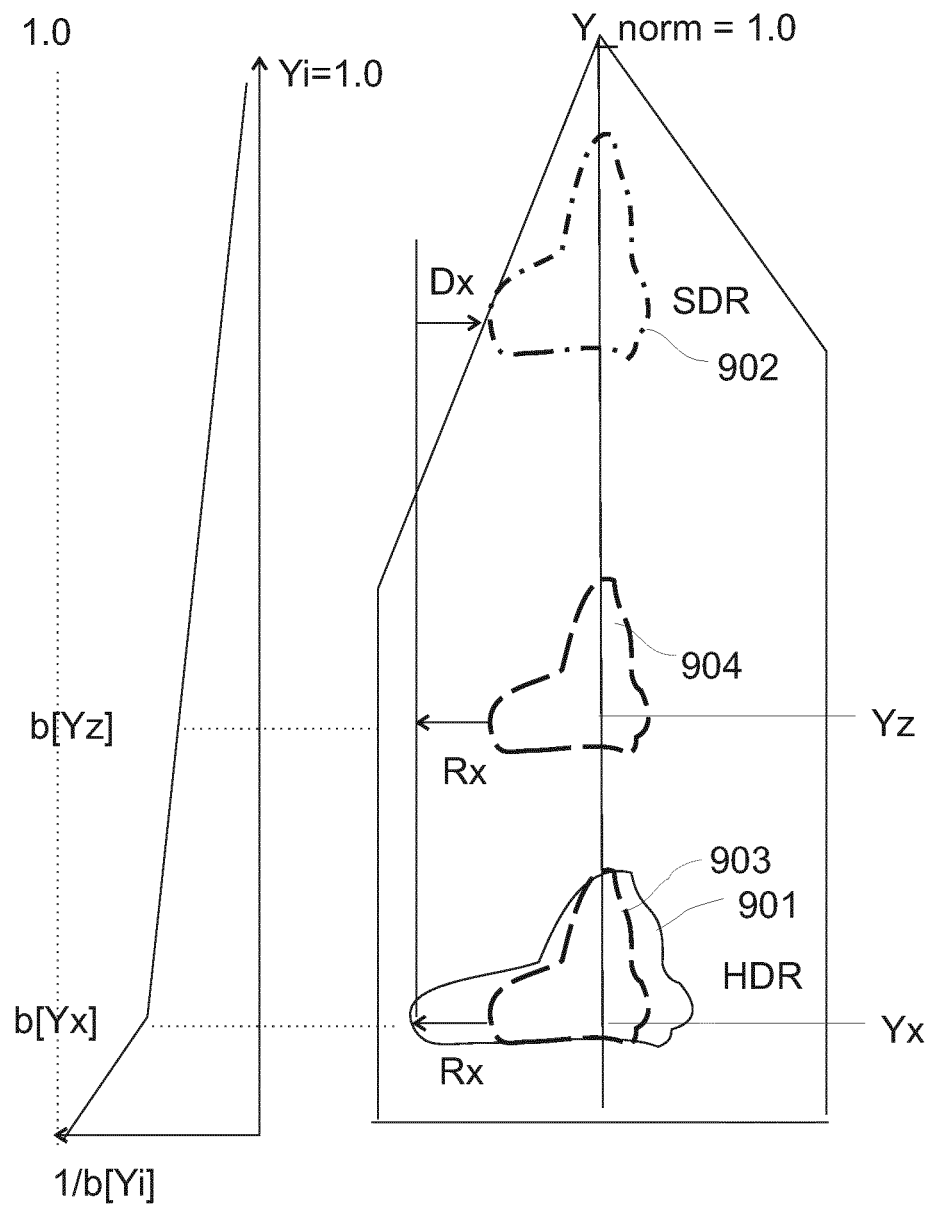
FIG. 9 schematically shows some relationships between saturations and various luminances.

FIG. 9 illustrates what is happening colorimetrically. If we had pure HDR reconstruction (i.e. not yet the MDR image generation of display tuning), the following would happen. The cloud of image colors, and in particular the saturated colors (say of a saturated blue dress of a lady) would on the encoding/transmitting/creation side be blob 901. Still on the encoding side, e.g. a human color grader determines that cloud 902 would be the best looking SDR equivalent colors. As before, the relative luminances are higher, because they need to be shown on a display with lower PB_D_SDR (100 nit typically) than the HDR display. Ideally the chromaticities should be the same, but that is not possible, because the cloud of relative SDR colors falls in the narrowing tip of the gamut. Hence, the grader has chosen an appropriate saturation dimming Dx. Actually, he can communicate a function Dx[Y] for all possible Y's (remember that we defined our codec philosophy in such a way that we could perform the SDR<>HDR re-grading and anything in between based on a monotonic luminance function F_Lt (as transmittable) solely, at least as far as the brightness behavior is concerned of the re-grading; so one can imagine that in correspondence to this one can define a similar Y-dependent function encoding a reasonable/optimal chromatic re-grading behavior). It may be even better to communicate the inverse (reciprocal) saturation boosting function Rx[Y], but that is an implementation detail.

A decoder now first luminance-adjusts the received SDR colors (mind, in this example we are now talking about received normalized SDR colors), to obtain an appropriately stretched (or sometimes compressed) cloud of HDR colors (cloud 903), but not yet of the correct chromaticity (because only a luminance processing, i.e. a multiplication with A, was performed for any color, so it will still have the SDR chromaticity of the received SDR image pixel (note that chrominances scale with luminance unlike chromaticities as used in this chromaticity-view, and in fact it is often useful to see 1/b[Y] as a function (1/Y_SDR)*bb[Y], the later component defining the gamut tip behavior). By receiving a saturation boost function 1/b[Yi], of which an example is given on the left, the receiver/decoder can now apply the correct saturation boost Rx for any possible luminance Yi of the pixel (Rx=b[Yi], e.g. b[Yx] for the saturated colors of the blob).

However, suppose the decoder now determines optimal MDR image luminances (and we still want to use this calculation topology, but obviously with all the correct functions being inputted and/or determined), then blob 904 will result for all the colors in the image being processed. Obviously, if one wants the MDR colors to look the same as the HDR colors (i.e. have the same chromaticities, and not be much more desaturated, or in other cases more saturated), one needs to apply the same Rx factor, but now to pixels which happen to have luminance Yz. Or formulated differently, one cannot use the boost factor b[Yz], because then the color will in this example be too unsaturated (or in general wrong). One needs to somehow know b[Yx] or in other words, Yx (we will detail below there are several embodiment manners of realizing the generic principle). Also, one can build on this principle for building more complex saturation processings, e.g. taking some color errors for gamut use optimization into account. The skilled reader will understand the similarity between this and what was explained above, but now transformed to the system which on the one hand works starting from an SDR input, and on the other hand works in an Y'CbCr-based calculation topology (the other teachings being used similarly).

Figure 10:
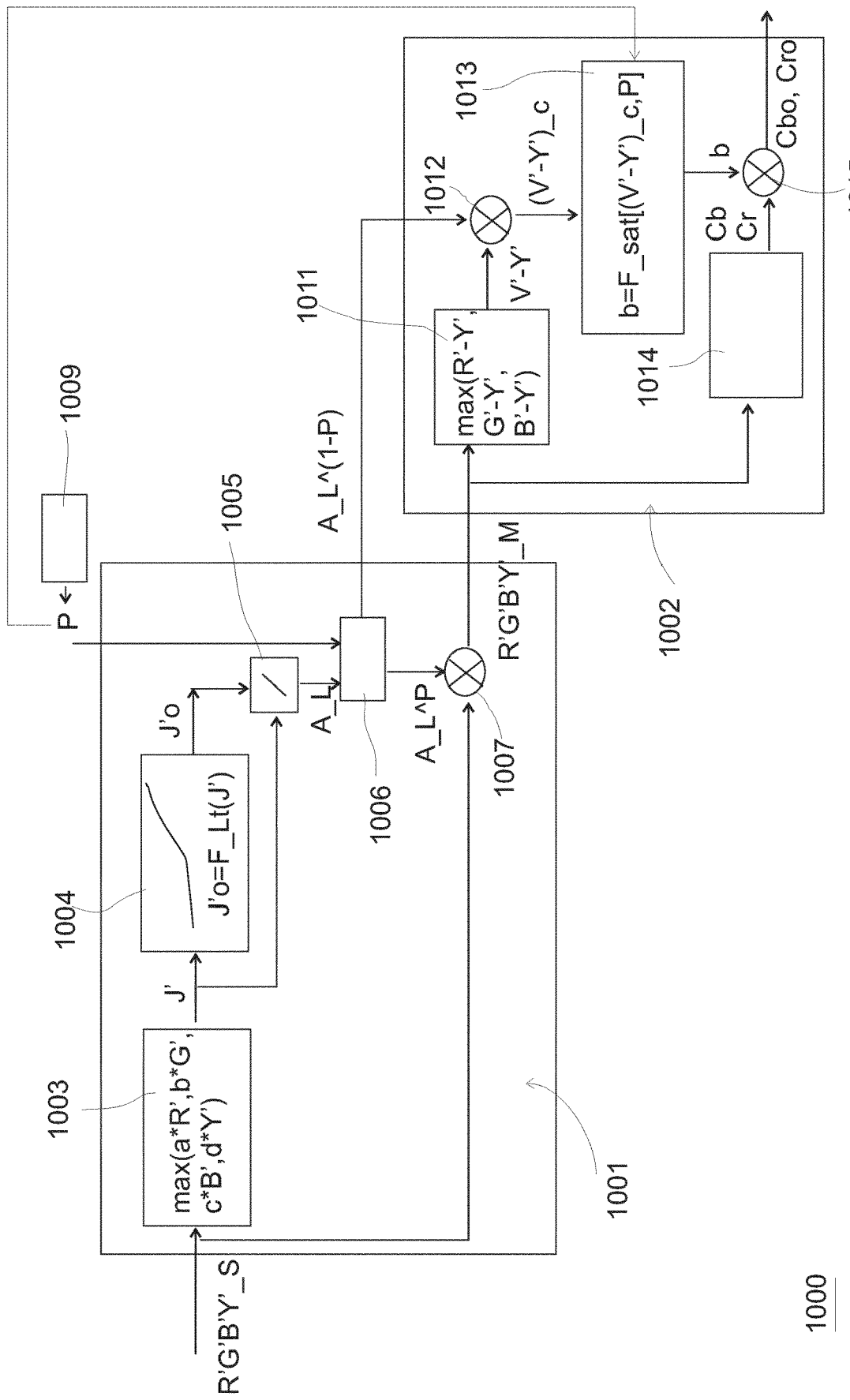
FIG. 10 schematically illustrates another possible embodiment of the two-luminance optimized saturation strategy for re-grading to MDR peak brightnesses for which no specific processing strategy was communicated (i.e. as e.g. dedicated luminance and saturation processing LUTs for that specific PB_MDR)

FIG. 10 gives another embodiment of the first type (post-saturation in the decoder, SDR received, direct luminance-based lookup of b at the correct lookup entry position, but now in another saturation mathematical strategy which is quite useful for dynamic range conversions). What is different here is that another quantity J' is used to quantify the brightness of pixels than luminance. It is calculated by brightness calculation unit 1003 as J'=max(a*R', b*G', c*B', d*Y'), with a,b,c, and d multiplication constants which can be chosen fixed ab initio, or optimized for a given HDR scene image(s), and communicated from the creation side. Applicant has done research on such quantities and their colorimetric behavior, and found that they can function as a good approximation of constant luminance over the various possible chromaticities in the gamut, yet with advantageous properties for HDR re-grading (such as simplicity, good gamut traversion control behavior, etc.), and functions on such a J' brightness measure can be applied similarly to the luminance-based versions in a related calculation topology. E.g. if one uses a F*_Lt(max(R,G,B)) brightness mapping, controlling the out of gamut risks become easier, however, one may need to design a different saturation behaviour, which however regarding its high level properties and in particular the display tuning properties of the present teachings behaves similarly to the above described.

The luminance mapping function F_Lt is then applied by brightness mapper 1004 to this brightness variable J', yielding output brightness measure J'o for each pixel. Another thing which is illustrated by this embodiment is the multiplicative application of the luminance processing of luminance processing unit 1001 (elucidated with FIG. 7), namely, divider 1005 calculates multiplier A_L as being J'o/J. Then a display tuning strategy is determined by display tuning unit 1009, which in this example calculates a power P (the technology of this brightness redetermination embodiment also works for other tuning strategies). A final to be applied multiplier A_L^P is calculated by final multiplier calculation unit 1006 by raising A_L to the power P (which is assumed to be fixed for now, and a function of the display peak brightness PB_D for which the MDR image needs to be calculated; if P=0 then an identity transform will be applied ergo the relative luminances of the input and output images will be the same which corresponds to serving a display which has the same display peak brightness PB_D as the coding brightness of the inputted image PB_C, and if P=1 one does the full luminance transformation for recovering the other extreme of the two reference gradings, e.g. the 4000 nit PB_C HDR image). The appropriate MDR color, here in this example represented as a redundant quadruple with also immediately Y'M being calculated, is obtained by multiplying the SDR input color (R'G'B'Y'_S) by the appropriate multiplier A_L^P for calculating the desired MDR image, which is performed by multiplier 1007. Interestingly, another output of the luminance processing unit 1001 is the multiplier A_L raised by another power, namely A_L^(1-P).

Figure 11:
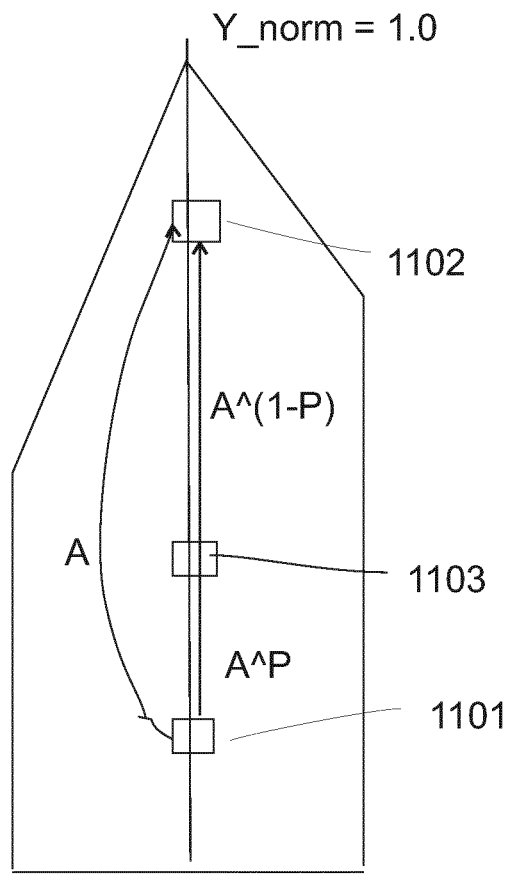
FIG. 11 schematically illustrates the relationship between the luminances for a particular pixel in a particular object when this gets optimized colors for three specific re-graded situations of an image optimized for respective 3 different display peak brightnesses.

What makes this useful is shown in FIG. 11. If a e.g. HDR luminance 1101 and SDR luminance 1102 are linked by a transformation being a multiplicative factor A (e.g. 10), then if an MDR luminance 1103 is related to the HDR color via a multiplier A^(P<1.0), then the following applies: one can calculate the HDR luminance from the MDR luminance, instead of from the SDR luminance, by using the factor A^(1-P).

Interestingly this behavior doesn't only apply to luminance (whether linear or non-linear), but also to some other variables, which are luminance-dependent. Returning to FIG. 10, the saturation processing unit 1002 doesn't apply a strategy Cb_out=b[Y]*Cb_in. It determines the saturation boost to be applied based on a quantity which can be calculated for all colors in the gamut which we call V'-Y', and which is calculated as the maximal value of the triplet (R'-Y', G'-Y', B'-Y'), by maximum calculation unit 1011. For completeness we'd like to note that although we elucidated this embodiment with the pragmatically useful non-linear R'G'B' (approximately a square root of the linear ones, because the SDR image is typically encoded according to the Rec. 709 OETF), the principle works also on linear RGB and V-Y, and even with weighted input in the maximum calculation. Determining a saturation constant depending on which V'-Y' value a color somewhere in the gamut has (rather than merely its luminance value) has interesting properties for desaturating colors in case the luminance mapping is performed based on a max(R'G'B') value strategy (although this is merely an embodiment detail for the present invention, for completeness in case the reader wants to know more details about this technology we refer to our WO2016055178), but again this should be the appropriate V'-Y' value, also for a display tuning situation. Applying the saturation to a V'-Y' value in case this was determined in the previous (luminance mapping 1001) stage for an MDR image (rather than the e.g. 5000 nit HDR reconstructed image, for which b[V'-Y'] would give an appropriate saturation boost factor), and inputting this V'-Y'_MDR index in the F_sat LUT in boost factor calculator 1013 will again give the wrong saturation boost, and e.g. much too saturated dark colors (the exact errors depending on the shape of the F_sat function). Note that on the encoder side there would be no problem, since first the correct saturation function behavior (Fsat, or b[ ]) is determined on the HDR normalized luminances color representation, and then the luminance mapping to the SDR reference image is performed.

So, (at the decoder side, for a PB_D-dependent calculation of a display tuned MDR image) one must determine a value (V'-Y')_c, which is the corrected V'-Y' value for doing the lookup (i.e. an embodiment of in our generic formulation the second luminance value, see also below). That will then give the correct boost factors for ultimately obtaining the correct output chrominances Cbo, Cro for the MDR image pixel colors (color converter 1014 calculates input chrominances Cb, Cr from the MDR pixel R'G'B' color components of the luminance processing stage). The skilled reader can see that multiplying the (incorrect) MDR V'-Y' value with the remaining multiplication value A_L^(1-P) by multiplier 1012, will re-obtain the corresponding correct HDR corresponding (V'-Y')_c value (which is the HDR luminance representative of the pair of SDR and HDR reference colors for which the optimal b-function was defined at the encoding side; i.e. the secondary luminance value of our generic concept, the first luminance being the normal luminance Y'_M, which will apart from entering the saturation processing, also function as one of the trio of output color coordinates, together with Cbo and Cro). And the b-factor determination will typically depend on the P factor also (which is in this embodiment a value representation of the second luminance), because the processing of chrominances needs to be scaled with their luminances. E.g. one may typically use: b=F_sat[(V'-Y')_c]^P. Interestingly the A_L^(1-P) value functions here as the equivalent of the HDR luminance (on the achromatic axis), as well as similarly being able to scale such trio for any particular chromaticity, on a V'=max(R', G', B') value, or a V'-Y' value (Y' being the luma of any pixel color in the gamut), so this is again in correspondence with this being an extra input of Y'_H as in the more generic example of FIG. 4, despite the colorimetric details now being worked out in a J'/V'-Y' color processing framework.

So apart from the correct index position, the content of the LUT may also depend on the medium dynamic range situation, in particular on the L_MDR.

Figure 12:
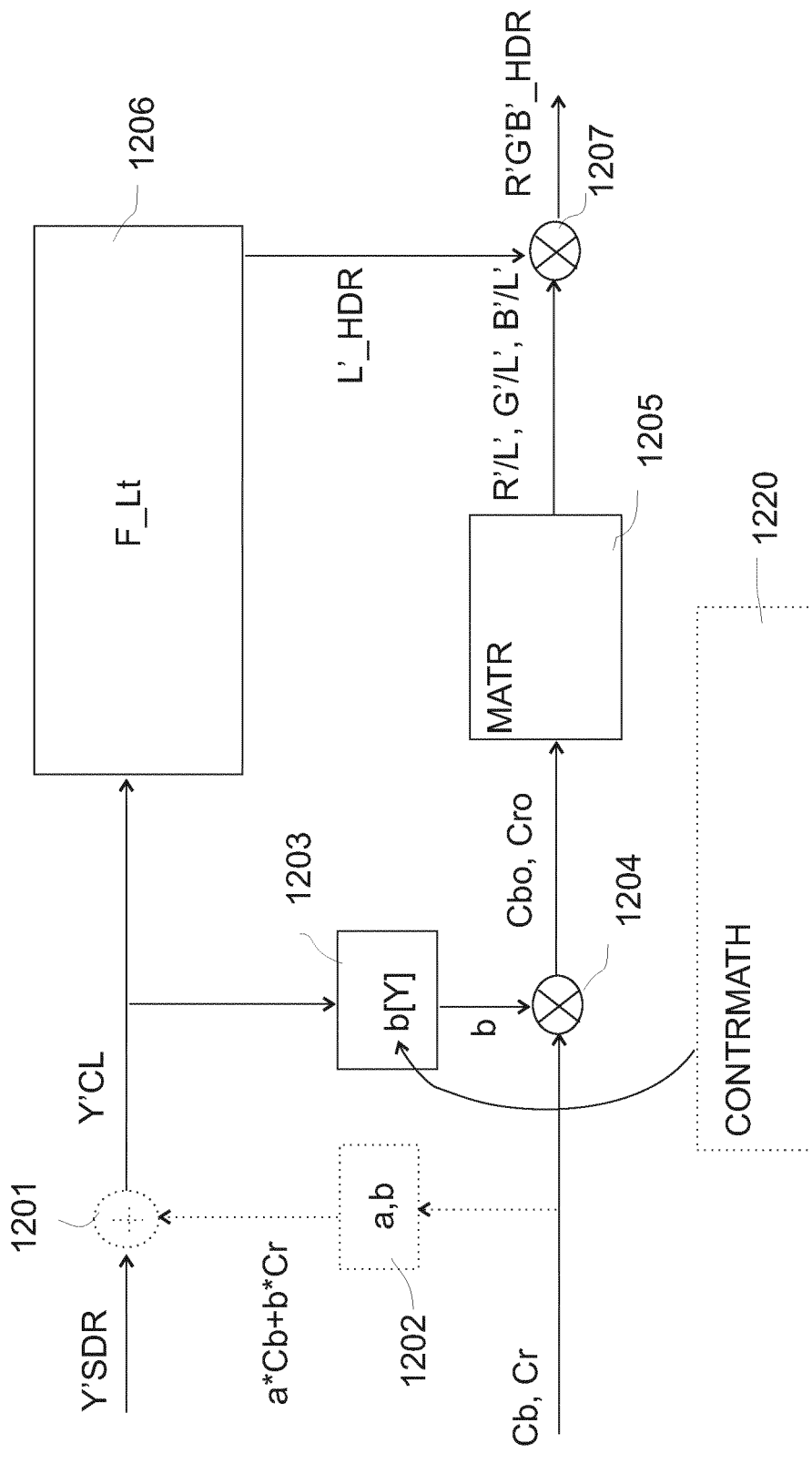
FIG. 12 schematically illustrates another useful decoder embodiment according to the principles of the invention.

FIG. 12 shows another HDR image or video decoder embodiment with display tuning capability, and now with first a saturation processing and then luminance adjustment (a final correct luminance determination for a normalized correctly saturated color), rather than in the opposite order as explained before. Y'SDR and the Cb and Cr chrominance components of the SDR image pixels are input (the circuit can work similarly in a down-grading mode when getting Y'CbCr normalized HDR colors as input). The SDR image's luminance may optionally have been adjusted for the color of pixels, with a correction dependent on Cb and Cr (to have a better artistic look of the image), so in that case such an operation must be undone by chromatic contribution calculator 1202, and adder 1201, which adds a*Cb+b*Cr to Y'SDR. The result is the true SDR luma of the pixels, i.e. the one that easily relates via luminance mapping to a corresponding HDR luminance (or luma), and MDR luminances.

Saturation boost factor calculator 1203 calculates the applicable saturation boost factor for this current pixel color, depending on index Y being the Y'CL value, and the shape of its saturation function as a function of Y (i.e. the b-function shape which the encoding side determined, and communicated). The SDR input chrominances are multiplied by this b value by multiplier 1204, yielding the output chrominances Cbo, Cro, which are correct for the MDR image situation (see colorimetric explanation below). These go in a color converter 1205, to get normalized (luminance-independent) non-linear R'G'B' components, namely R'/L', G'/L' and B'/L'. All what is needed then is to multiply those with the appropriate luminances L'_HDR of the pixels with multiplier 1207, to get the correct HDR R'G'B' values: R'G'B'_HDR (the apparatus can be so formulated that these can be in some value definition, e.g. 0-5000, or also still in the 0-1.0 representation, but, what is important, correctly placed for the HDR relative luminance, compared to the (relative) SDR luminance). The HDR luminance L'_HDR are again calculated from the SDR luminances by some process executed by luminance transformer 1206, which in practice can be a sequence of useful functions (a conversion function to a perceptually uniform domain, then a coarse inter-region contrast controlling function, the an object fine-grading function, etc.), but again we assume for explanation here that the input Y'CL and output L'_HDR are just linked by some (variable, Y'CL-dependent) multiplicative A-factor.

Now interestingly, the two relevant luminance values for the saturation processing of a dynamic range conversion process can be used in different embodiments in various manners.

A first manner is to use the second luminance directly: as the correct x-coordinate to lookup the b-value (i.e. as elucidated with FIG. 9: use the secondary luminance position Yx, instead of the primary position Yz being the luminance of the MDR image; or in FIG. 4: use the secondary luminance Y'_H, instead of the primary luminance incoming over input 404 from the SDR-to-MDR luminance calculation). However, another manner to realize the same, is to recalculate the saturation boost function b[Y], which can then be indexed directly by the first luminance (but the secondary luminance will still be needed by the saturation processing method to be able to calculate this new b-function shape). This will then also be done with the secondary luminance, so the saturation in its totality will generically still depend on the two luminances.

Figure 13:
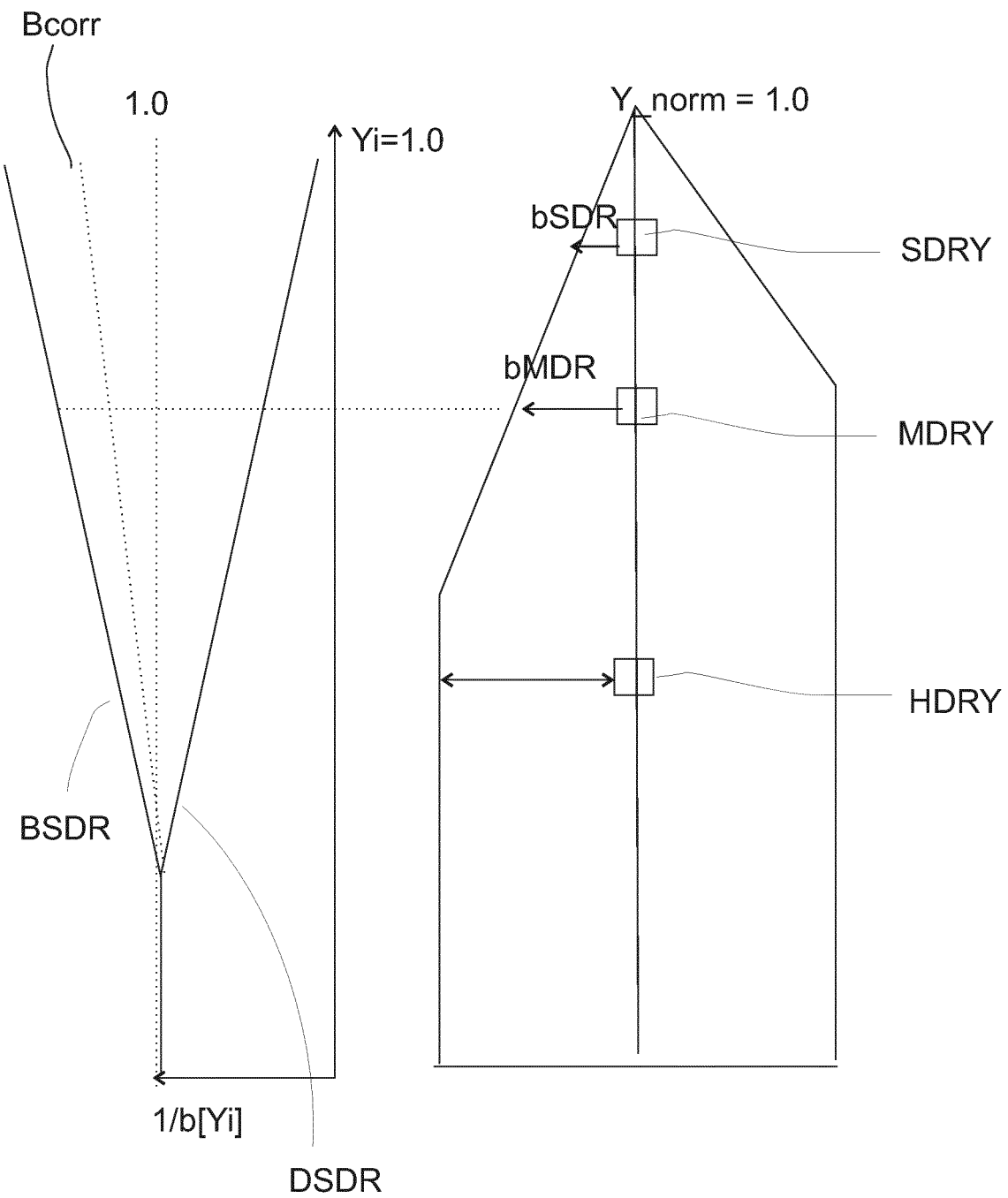
FIG. 13 schematically illustrates what color processing is involved in that embodiment, and how it can lead to defining the correct F_sat LUT functional shape, for any particular connected MDR display, which needs an output image optimized for its PB_MDR.

This is illustrated with FIG. 13.

As said, there will be a relationship between the three luminances, the SDR luminance SDRY which (in the previous example of FIG. 12) the receiver gets as input, the corresponding HDR luminance HDRY which would follow from reconstruction of the master HDR image corresponding to the received SDR graded image (it was taught that this duo is uniquely fixed by the two reference image gradings created at the encoding side, and the corresponding F_L_s2h respectively F_L_h2s co-communicated as the luminance mapping function for calculating the one from the other;

whichever one was received in the input image), and the MDR luminance MDRY (calculable by the tuning algorithm, and corresponding to F_L_da, whether in the upgrading from SDR or downgrading from HDR configuration, and which F_L_da function is derivable based on the F_L_s2h respectively F_L_h2s function as explained). The figure elucidates the needed squeezing in the tip of the SDR gamut (because normalized HDR colors will need to get relatively brightened to a certain extent to become SDR colors, some saturation decrease will be necessary to map within gamut, especially for HDR image communication methods which work on the basis of reversing the HDR-2-SDR color mapping of the encoder). HDR colors, e.g. in the full saturation range, will saturation decrease to the SDR chromaticity saturation according to selected profile DSDR (e.g. created by the human color grader, or an algorithm that looks at the statistics of all colors, and how bad e.g. some saturation clipping in a red apple would be compared to the impact of the rest of the image, etc.). So, the saturation boost factors b[SDRY] to obtain the correct saturation for the HDR image pixels (reconstructed from the received SDR image pixels), are given by the inverse curve BSDR. Now the question is however which saturation is needed for the MDR image pixels? This can be obtained as b[SDR-to-MDR]=b[SDR-to-HDR]/b[MDR-to-HDR] (drawn schematically as bSDR/bMDR in the figure). The first b is the one of the function BSDR, because it is the saturation change between the two reference grading situations, as it would also be knowable at the encoder side. The second bMDR, since the HDR saturation goes full range (even when MDR would project to a virtual lower HDR luminance) can also be read from the BSDR graph, but at the different position (indicated by the horizontal dotted line). With a numerical example for clarity: if the SDR saturation boosts to the HDR (full) saturation by a factor e.g. 7, and the MDR luminance position (i.e. saturated colors in such a position) boost with a factor 3 to HDR, then the boost needed to move from the SDR input luminance position to the corresponding MDR luminance position will be 7/3. This principle will yield the Bcorr function, which can be directly applied between the SDRY-defined chrominances and the MDRY-defined color.

The reader sees that this again follows our generic formulation of the new technology (as claimed): we want a correct final saturation function Bcorr, which takes as LUT input SDRY (because that is the luminance which we got from the input image, and belongs to the input Cb and Cr values, to be by our new saturation strategy correctly saturated to obtain the MDR output color, and SDRY being the first luminance of our generic principle), but to be able to determine this correct Bcorr function, we need a secondary luminance HDRY, to read the b[SDR-to-HDR] value needed for the determination of Bcorr.

Since ultimately this depends just on the various possible color values (i.e. SDRY together with the chromaticity of that input color determining the whole relationship), it can be calculated once for all possible SDRY values and the most saturated possible color, by saturation function determining unit 1220. So the skilled reader should understand that, although our new framework is designed to be versatile and able to work generically with several tastes of display tuning expertise, once a strategy is defined in e.g. a television, the derivation of the F_L_da function shape will be uniquely defined from the received F_L_s2h function shape, and so the SDRY, MDRY and HDRY trio will be uniquely determined starting from any one of that trio, hence the explained method to derive Bcorr is uniquely defined (this example can also be formulated with the deeper HDR luminance corresponding to the MDR color interpreted as an SDR color as explained above).

Once this Bcorr function is (pre-)loaded, the rest of the decoder 1200 can just process with the correct color processing mathematics pixel by pixel as they come in. This situation needs only to be reset if the re-grading techniques change, e.g. at the start of a new shot of images, of a new HDR scene (e.g. when the actor moves from indoors, to an outdoors scene, which needs a different relationship between the darker respectively brighter image regions in the HDR respectively SDR reference image, i.e. a new F_L_s2h—and typically also a new b[HDR-2-SDR]—which will restart the above calculation by unit 1220 and have the new Bcorr LUT or in general saturation calculation algorithm loaded in 1203 before the first pixel of the first image of that new scene needs to be changed to an MDR color pixel, so that b=Bcorr[Y_in_pixel] can be established for the luminance or luma Y_in_pixel of the pixel being currently processed).

With FIG. 14 we would like to elucidate a last example of the dual-luminance-based saturation processing, which is also typical in display tuning image dynamic range re-grading. FIG. 14A shows two luminance mapping functions. Function 1402 would be appropriate in the scenario where the receiver gets a HDR input image (e.g. with luminances of the image pixels potentially up to a maximum of PB_C_HDR=5000 nit), and needs to calculate optimal luminances for an MDR display of e.g. PB_D=700 nit, in case the viewing environment and display black capabilities of the MDR display are substantially identical to those of the reference display which was used to create the master HDR graded image (i.e., at least as far as the darkest image colors are concerned, to tuning is needed, and the normal HDR image can be shown, just as it would look on the encoding side). However, some different receiving-side technical factors could lead to the fact that a criminal hiding in the dark is not well-visible on the actual display at the receiving/viewing side. A solution to that may be to define an HDR-to-MDR luminance mapping function which takes into account the different, actual black situation at the receiving side, which is second luminance mapping function 1401. This has an offset for the darkest image colors, e.g. DEL for the darkest codeable color (note that the colors, and functions don't actually go through zero, but through a small luminance value, e.g. 0.0001 nit). So we can say that function 1402 is the F_L_h2s function as received (there may also be PB_D-dependent display adaptation, but the simplest variant merely corrects for the darkest colors implementing the HDR-to-SDR mapping for the brighter colors as specified in F_L_h2s), and function 1401 will be a HDR-2-MDR luminance mapping function which is calculated at the receiving side (now not just dependent on the display peak brightness PB_D, but in this example mostly on the minimum discernable black MB_D, which we assume to be equal to DEL here).

The problem now is that if one used a processing like e.g. in FIG. 4 (i.e. with a luminance-dependent saturation calculation, but without an appropriately smartly designed algrotihm of the saturation factor determination unit 402), then the multiplicative factor of the (considerably different from zero because offset by DEL) output luminance (of luminance processing in unit 401) divided by the approximately zero input luminance would be very high. So the multipliers 410 and 411 would also boost the saturation by much too high a boost factor b, leading to far too saturated dark colors, and in summary an ugly MDR image.

How unit 402 can better behave is illustrated in FIG. 14B. Color 1411 and 1412 are two MDR colors in case of no black adjustment (i.e. when calculated according to function 1402; just two example colors in the darker part of the luminance range). Colors 1413 and 1414 are the luminance-offsetted colors resulting from applying function 1401 to the corresponding HDR input colors. The correct saturation can be applied, if it is determined based on the two luminances Yb (with black adjustment) and Yn (without black adjustment), namely by correcting the saturation boost factors by a multiplier equal to M=Yn/Yb. The received saturation function (F_sat, or in other words b[y]), which would be the function for the ideal situation in which the black of the receiving-side display ideal to the black of the reference display corresponding to the received input image coding, will be multiplied by this factor M, to yield the correct saturation processing for generating this particular needed MDR image. This is again an embodiment in line with our general principles as formulated, and exemplified by the other examples above. Now it takes into account that the chrominances of the darker colors will fall in the cylindrical part of the gamut, but still need to be scaled by the correct Y value. Whatever saturation improvement b[Y_SDR] (e.g., if the saturation mapping was applied by a down-grading encoder and decoder after the luminance mapping) was elected at the encoding side, it should be indexed with Y_MDR, being here the brightness-increased luminance by shifting with an amount DEL, but rather by using the corresponding secondary luminance index position (Yn) (which corresponds to the Y'_H of FIG. 4). The multiplication by the fraction of the two luminances is an example of the technique of correcting the B_init to Bcorr saturation boost function shape whilst leaving the input lookup position into the LUT unchanged. Note that this still follows the core principle that the Y as determined to be the correct Y from the luminance optimization path is different than the Y to be used for the saturation processing sub-circuit.

Figure 15:
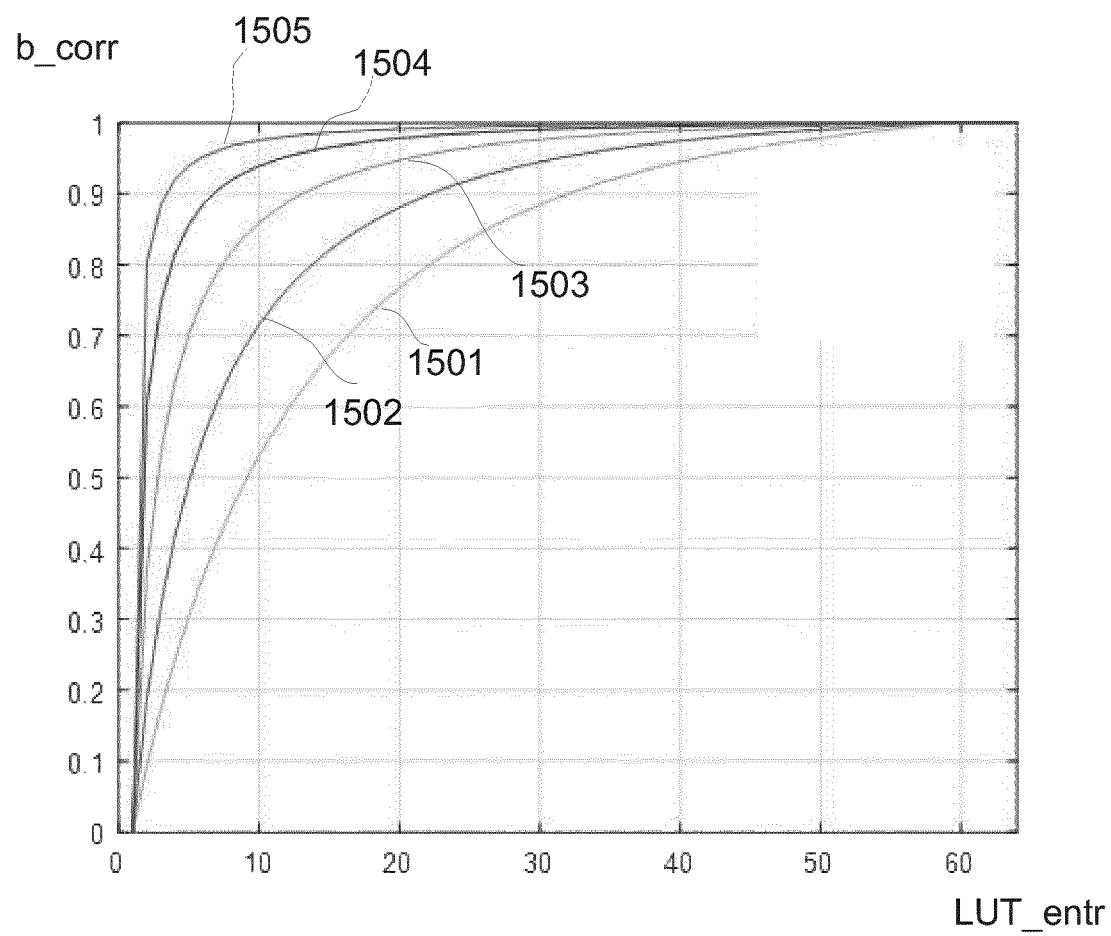
FIG. 15 schematically shows some correction curves based on luminance for that exemplary embodiment.

FIG. 15 gives an example of what such a correction would look like, for several receiving-side black rendering display capabilities: 1501 is the multiplicative correction function (i.e. the M factor for all possible Y-values, here on the x-axis as LUT entries) for a minimal renderable black of 1 nit (the reader can for his understanding assume it is e.g. a very bad LCD display, which would show lower values of the image content as indiscriminable leak light, or a viewing in a relatively bright environment). Curve 1502 corresponds to a minimal renderable or perceivable black of 0.1 nit, curve 1503 corresponds to 0.01 nit, 1504 to 0.001 nit, and curve 1505 to 0.0001 nit. The horizontal axis is a 6 bit (0-64) index indicating luminances in a loggamma perceptual representation (merely an example how to realize it). We find again that this is a saturation processing dependent on two luminance values, namely a before a luminance transformation Y-value, and an after the luminance transformation Y-value, and only one of those two would be knowable at the content creation side (where an optimal saturation processing strategy, i.e. F_sat, has to be determined). I.e. the saturation boost factor to be applied by the multiplier, is b_result=M*b_in[Y_HDR].

The algorithmic components disclosed in this text may (entirely or in part) be realized in practice as hardware (e.g. parts of an application specific IC) or as software running on a special digital signal processor, or a generic processor, etc. A memory product may e.g. be a portable memory such as a blu-ray disk or a solid state memory stick, but also e.g. a memory in an offsite server from which video or image can be downloaded to a remote location of usage of the video or image. The technical principles will work similar in other color processing embodiment circuit topologies, and/or with other color definitions, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:
1. An apparatus for processing a color saturation of an input color of an input image comprising:
 a receiver circuit,
  wherein the receiver circuit is arranged to receive a luminance mapping function and an initial saturation processing function,
  wherein the luminance mapping function defines a mapping between a luminance of the input color of the input image and a reference luminance,
  wherein the initial saturation processing function defines saturation multipliers for different values of the luminance of the input color;
 a display tuning circuit, wherein the display tuning circuit is arranged to calculate a display tuned luminance mapping function based on the luminance mapping function and at least one of a display peak brightness and a minimum discernable black;

a luminance processor circuit, wherein the luminance processor circuit is arranged to apply the display tuned luminance mapping function so as to determine an output luminance from the luminance of the input color;

a saturation processing circuit, wherein the saturation processing circuit is, arranged to map an input color saturation to a color saturation of an output color on the basis of a saturation processing function which specifies saturation multipliers for normalized luminance values; and a saturation multiplier determination circuit,
wherein the saturation multiplier determination circuit is arranged to calculate a final saturation processing function based on an initial saturation processing function and based on a secondary luminance value,
wherein the secondary luminance value is derivable from the output luminance by applying a luminance mapping function based on the luminance mapping function,
wherein the saturation processing circuit is arranged to calculate the color saturation of the output color by applying the final saturation processing function,
wherein the output image corresponds to the input image,
wherein the output image is a re-grading of the input image characterized by the fact that its pixel colors have a different normalized luminance position compared to normalized luminance positions of the input colors,
wherein the normalized luminances are defined as the luminance of a pixel divided by a respective maximal codeable luminance of the image's luminance representation.

2. The apparatus as claimed in claim 1, wherein the secondary luminance value is used as an input coordinate of the initial saturation processing function to get a multiplier which is the value of the initial saturation processing function for that secondary luminance value.

3. The apparatus as claimed in claim 2,
wherein the input luminance and the secondary luminance value is a luminance calculated with a first luminance mapping function,
wherein the first luminance mapping function optimizes for a first rendering capability of the darkest colors of the input image of a receiving side display,
wherein the secondary luminance value is a luminance calculated with a second luminance mapping function which optimizes for a second rendering capability of the darkest colors of the input image of an actual receiving side display.

4. The apparatus as claimed in claim 1, wherein the secondary luminance value is used to calculate a new output coordinate of the final saturation processing function for each possible normalized luminance of the input color.

5. The apparatus as claimed in claim 4,
wherein the input luminance and the secondary luminance value is a luminance calculated with a first luminance mapping function,
wherein the first luminance mapping function optimizes for a first rendering capability of the darkest colors of the input image of a receiving side display,
wherein the secondary luminance value is a luminance calculated with a second luminance mapping function which optimizes for a second rendering capability of the darkest colors of the input image of an actual receiving side display.

6. The apparatus as claimed in claim 1,
wherein one of the input luminance and the secondary luminance value is a luminance calculated with a first luminance mapping function,
wherein the first luminance mapping function optimizes for a first rendering capability of the darkest colors of the input image of a receiving side display, and
wherein the other one of the input luminance and the secondary luminance value is a luminance calculated with a second luminance mapping function,
wherein the first luminance mapping function optimizes for a second rendering capability of the darkest colors of the input image of an actual receiving side display.

7. The apparatus as claimed in claim 1, wherein the apparatus is arranged to output an image with a peak luminance of at least 500 nit.

8. A method of processing a color saturation of an input color of an input image comprising:

receiving a luminance mapping function and an initial saturation processing function,
wherein the luminance mapping function defines a mapping between a luminance of the input color and a reference luminance,
wherein an initial saturation processing function defines saturation multipliers for different values of the luminance of the input color;

calculating a display tuned luminance mapping function based on the luminance mapping function and at least one of a display peak brightness and a minimum discernable black;

applying the display tuned luminance mapping function so as to determine an output luminance of an output image from the input luminance of the input color;

calculating a final saturation processing function based on an initial saturation processing function and based on a secondary luminance value,
wherein the secondary luminance value is derivable from the output luminance, mapping an input color saturation to obtain a color saturation of an output color on the basis of a saturation processing function which specifies saturation multipliers for normalized luminance values; and
wherein the color saturation of the output color is calculated by applying the final saturation processing function,
wherein the output image is a re-grading of the imput image characterized by the fact that its pixel colors have a different normalized luminance position compared to normalized luminance positions of the input colors,
wherein the normalized luminances are defined as the luminance of a pixel divided by a respective maximal codeable luminance of the image's luminance representation.

* * * * *